(12) United States Patent
Wang et al.

(10) Patent No.: US 11,863,972 B2
(45) Date of Patent: Jan. 2, 2024

(54) RESOLVING RESERVATION AMBIGUITY OF SIDELINK CONTROL INFORMATION REPETITION IN SIDELINK COMMUNICATIONS

(71) Applicant: QUALCOMM Incorporated, San Diego, CA (US)

(72) Inventors: Xiaojie Wang, Hillsborough, NJ (US); Jing Sun, San Diego, CA (US); Xiaoxia Zhang, San Diego, CA (US); Yisheng Xue, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 17/237,804

(22) Filed: Apr. 22, 2021

(65) Prior Publication Data

US 2022/0346120 A1    Oct. 27, 2022

(51) Int. Cl.
| | |
|---|---|
| *H04W 72/21* | (2023.01) |
| *H04W 72/1263* | (2023.01) |
| *H04W 72/044* | (2023.01) |
| *H04W 72/23* | (2023.01) |
| *H04W 72/51* | (2023.01) |

(52) U.S. Cl.
CPC ......... *H04W 72/21* (2023.01); *H04W 72/044* (2013.01); *H04W 72/1263* (2013.01); *H04W 72/23* (2023.01); *H04W 72/51* (2023.01)

(58) Field of Classification Search
CPC ........... H04W 72/1284; H04W 72/048; H04W 72/044; H04W 72/1263; H04W 72/14
See application file for complete search history.

(56) References Cited

U.S. PATENT DOCUMENTS

| | | | |
|---|---|---|---|
| 10,893,557 B2 * | 1/2021 | Gulati | H04B 7/15542 |
| 2019/0007974 A1 * | 1/2019 | Nguyen | H04W 4/44 |
| 2019/0182643 A1 * | 6/2019 | Kim | H04L 1/1607 |
| 2021/0007081 A1 * | 1/2021 | Shin | H04L 1/1887 |
| 2021/0022127 A1 * | 1/2021 | Xu | H04L 1/189 |
| 2021/0067290 A1 * | 3/2021 | Chen | H04L 5/0033 |
| 2021/0243749 A1 * | 8/2021 | Hoang | H04W 24/08 |
| 2021/0297221 A1 * | 9/2021 | Lee | H04L 1/1864 |
| 2021/0306824 A1 * | 9/2021 | Li | H04L 1/1819 |

(Continued)

FOREIGN PATENT DOCUMENTS

WO    WO-2021030661 A1 *    2/2021    ......... H04W 52/146

*Primary Examiner* — Parth Patel
(74) *Attorney, Agent, or Firm* — Arent Fox, LLP

(57) ABSTRACT

Example implementations include a method, apparatus and computer-readable medium of wireless communication over a sidelink between a transmitting user equipment (UE) and a receiving UE. The receiving UE may receive a configuration of multiple resource pools for sidelink communications. The transmitting UE may transmit at least two repetitions of a sidelink control information (SCI) on at least two of the multiple resource pools. Each repetition of the SCI includes a reservation for a physical sidelink shared channel (PSSCH) on a respective resource pool. The receiving UE may perform soft combining on the at least two repetitions of the SCI to determine resources for the PSSCH. The receiving UE may decoding the PSSCH based on the SCI, for example, by combining multiple repetitions of the PSSCH on the reservations indicated by the SCI.

20 Claims, 12 Drawing Sheets

(56) References Cited

U.S. PATENT DOCUMENTS

| | | | | |
|---|---|---|---|---|
| 2022/0077991 A1* | 3/2022 | Hwang | .................. | H04L 5/0094 |
| 2022/0159674 A1* | 5/2022 | Deng | .................. | H04W 72/044 |
| 2022/0174682 A1* | 6/2022 | Li | ......................... | H04W 72/56 |
| 2022/0225292 A1* | 7/2022 | Mohammad Soleymani | .............. | |
| | | | | H04W 84/005 |
| 2022/0225297 A1* | 7/2022 | Wang | .................... | H04W 28/16 |
| 2022/0231898 A1* | 7/2022 | Li | ........................ | H04L 27/2657 |
| 2022/0232527 A1* | 7/2022 | Hong | .................... | H04W 72/20 |
| 2022/0312388 A1* | 9/2022 | Zhao | .................... | H04L 5/0091 |
| 2022/0346120 A1* | 10/2022 | Wang | .................... | H04W 72/23 |
| 2022/0361216 A1* | 11/2022 | Xue | .................. | H04W 72/0466 |

* cited by examiner

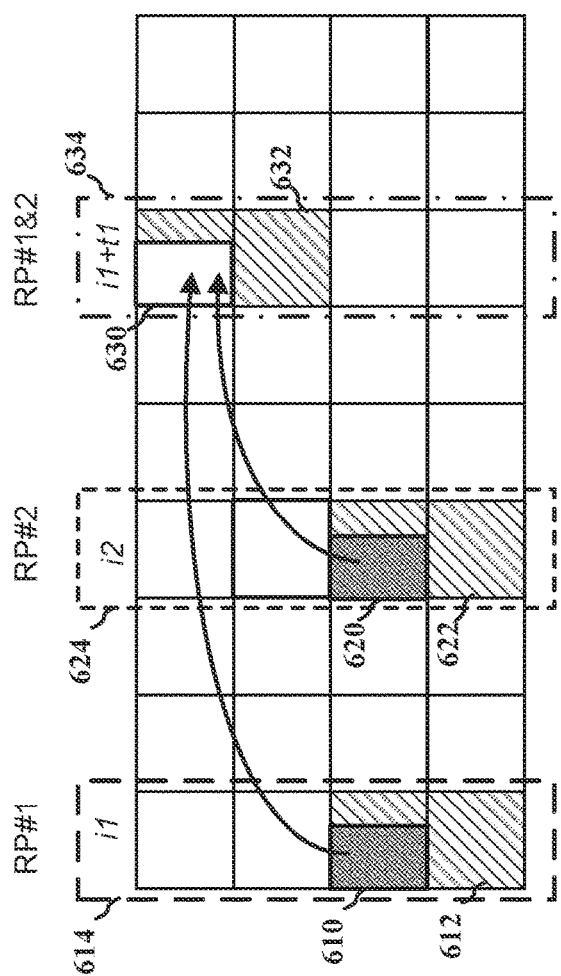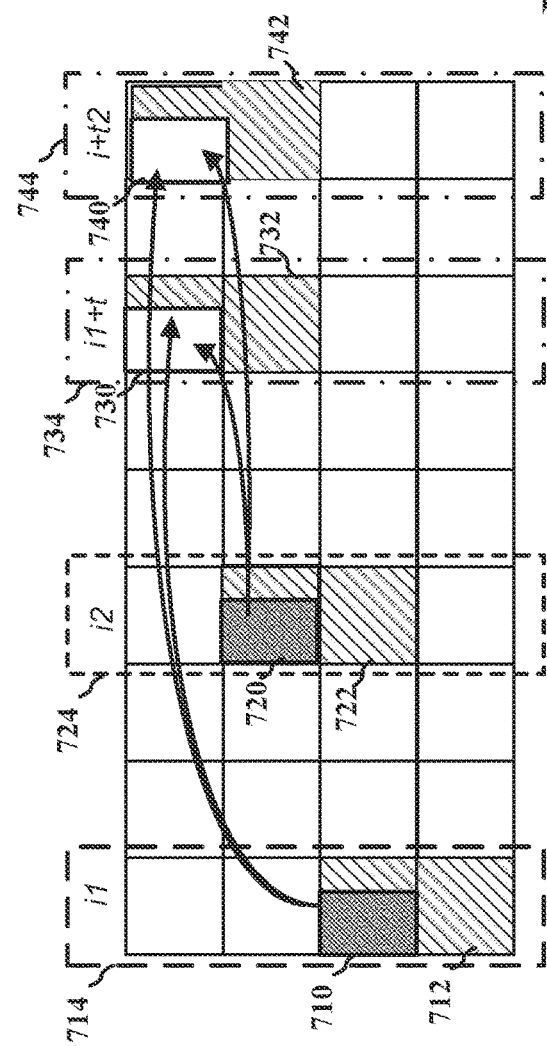

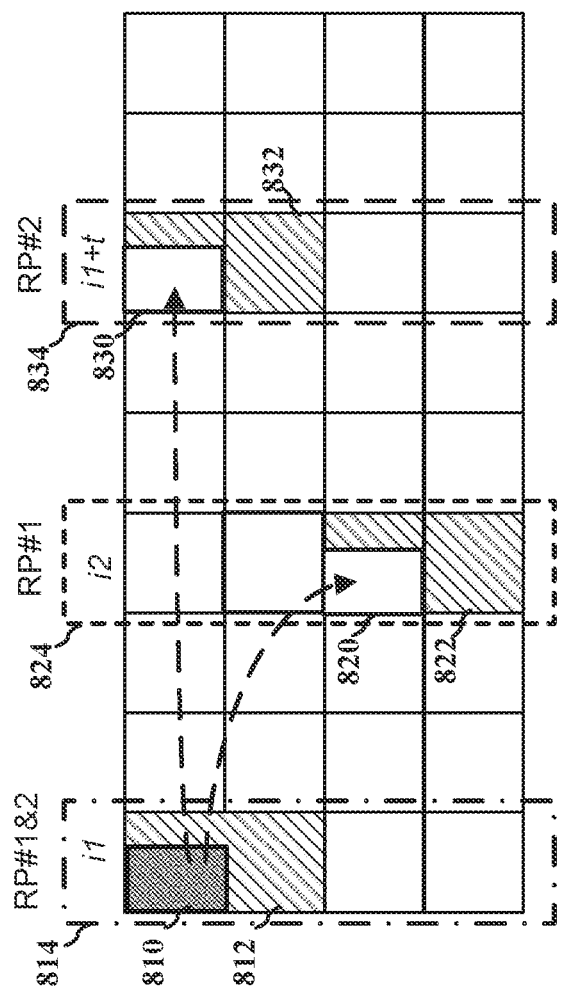

RESOLVING RESERVATION AMBIGUITY OF SIDELINK CONTROL INFORMATION REPETITION IN SIDELINK COMMUNICATIONS

BACKGROUND

Technical Field

The present disclosure relates generally to communication systems, and more particularly, to apparatuses and methods of resolving reservation ambiguity of sidelink control information (SCI) repetition in sidelink communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a first user equipment (UE). The method may include receiving a configuration of multiple resource pools for sidelink communications. The method may include receiving at least two repetitions of a sidelink control information (SCI) on at least two of the multiple resource pools, each repetition of the SCI includes a reservation for a physical sidelink shared channel (PSSCH) on the respective resource pool. The method may include performing soft combining on the at least two repetitions of the SCI to determine resources for the PSSCH. The method may include decoding the PSSCH based on the SCI.

The disclosure also provides an apparatus (e.g., a user equipment) including a memory storing computer-executable instructions and at least one processor configured to execute the computer-executable instructions to perform the above method, an apparatus including means for performing the above method, and a computer-readable medium storing computer-executable instructions for performing the above method.

In an aspect, the disclosure provides a method of wireless communication for a UE. The method may include transmitting a configuration of multiple resource pools for sidelink communications. The method may include transmitting at least two repetitions of a SCI on at least two of the multiple resource pools, each repetition of the SCI includes a reservation for a PSSCH on the respective resource pool. The method may include transmitting the PSSCH on each of the multiple resource pools based on the SCI.

The disclosure also provides an apparatus (e.g., a user equipment) including a memory storing computer-executable instructions and at least one processor configured to execute the computer-executable instructions to perform the above method, an apparatus including means for performing the above method, and a computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6 is a diagram of an example of a reservation on overlapping resource pools.

FIG. 7 is a diagram of an example of multiple reservations on overlapping resource pools.

FIG. 8 is a diagram of an example of a SCI on an overlapping resource pool.

DETAILED DESCRIPTION

Figure 1:
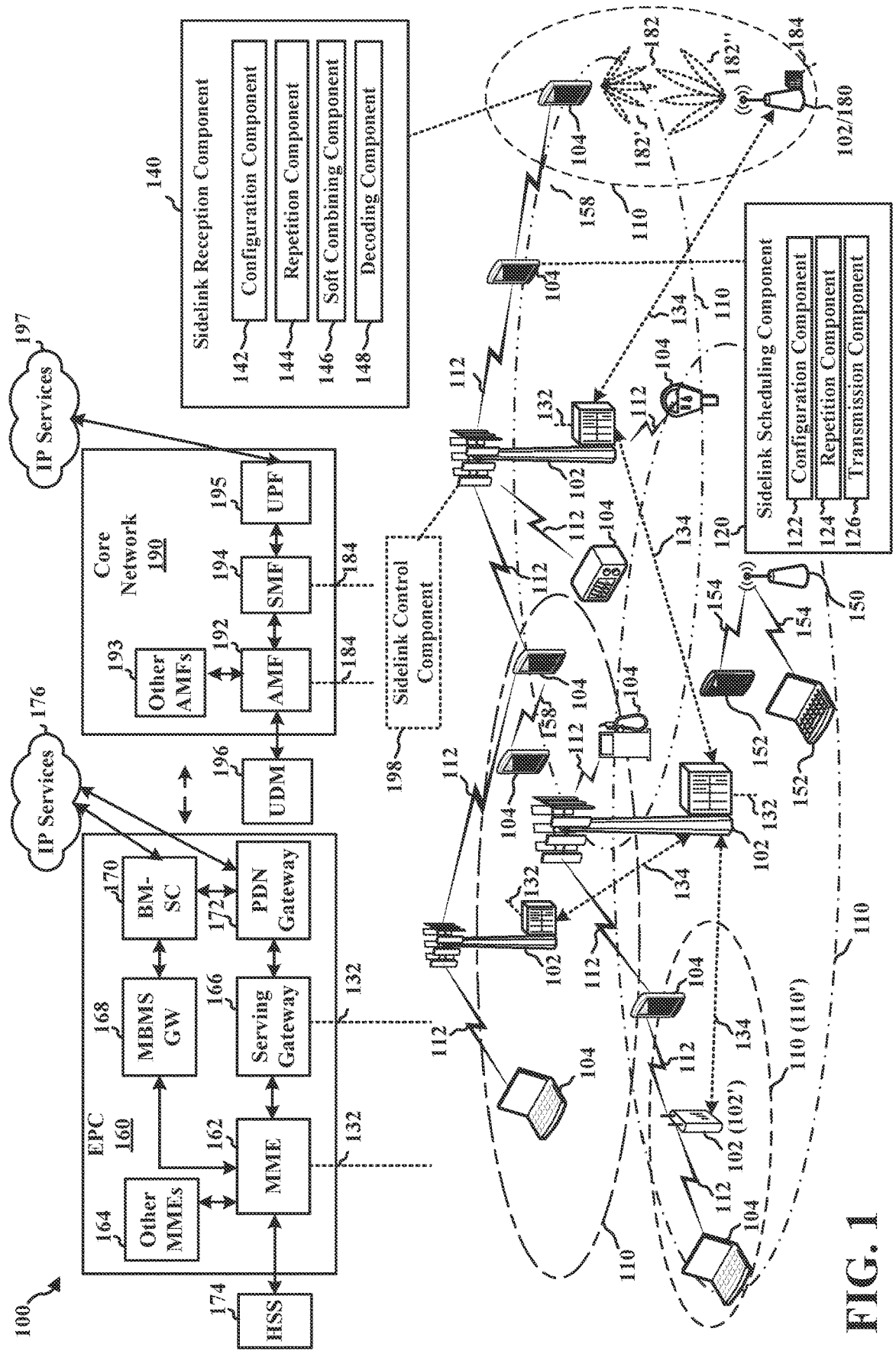
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A user equipment (UE) may communicate with another wireless communication device via a sidelink, which may also be referred to as direct link communications of device-to-device (D2D) communication technologies. As used herein, a direct link refers to a direct wireless communications path from a first wireless device to a second wireless device. For example, in fifth generation (5G) new radio (NR) communication technologies a direct link between two user equipment (UEs) may be referred to as a sidelink (SL), as opposed to communications over the Uu interface (e.g., from gNB to UE). Direct links may be utilized in D2D communication technologies that can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a direct link channel.

A UE may be configured for mode 1 sidelink scheduling in which the base station (e.g., gNB) may be responsible for scheduling sidelink transmissions between UEs. The base station may transmit a grant (e.g., downlink control information (DCI)) on a physical downlink control channel (PDCCH) to a transmitting UE and/or the receiving UE. The transmitting UE may transmit a sidelink control information (SCI) on a physical sidelink control channel (PSCCH) to provide additional information about the transmission. A UE may be configured for mode 2 sidelink scheduling in which the base station (e.g., gNB) may configure PSCCH/PSSCH occasions on which the UE is to monitor a PSCCH for a sidelink grant from a second UE for receiving the PSSCH. The PSSCH/PSSCH occasions may define time-domain and frequency-domain resources on which the PSCCH and the PSSCH may be received when the UE is configured for mode 2 sidelink scheduling. The time-domain resources may be defined as a number of slots or number of symbols. The frequency-domain resources may be defined as a number of sub-carriers. The second UE may be configured with transmission resources corresponding to the PSCCH/PSSCH occasions. When the second UE has data to transmit to the first UE, the second UE may autonomously schedule a sidelink transmission by transmitting a SCI on the PSCCH/PSSCH occasions.

If a UE does not receive a SCI that schedules a PSSCH transmission, the UE is also unable to receive the PSSCH. One technique to improve reception of SCI and PSSCH would be to repeat the SCI such that the UE may use soft combining to improve a likelihood of correctly decoding the SCI. Soft combining may refer to combining repetitions of a received signal prior to decoding the combined signal. The SCI may reserve resources for the PSSCH using repetition. In particular, the SCI may include a time domain resource allocation that defines resources for the PSSCH relative to the SCI. If the SCI is repeated, the repetitions of the SCI may define different resources for the PSSCH. Accordingly, repetition of the SCI may introduce ambiguity regarding the resources for PSSCH.

In an aspect, the present disclosure provides for repetition of SCI using multiple resource pools. The SCI may be repeated on each of the multiple resource pools and define a reservation on each of the multiple resource pools. The UE may perform soft combining on the multiple resource pools to improve decoding probability of the SCI. Because the reservation is defined based on logical resources for the respective resource pool, there is no ambiguity as to the resources for the PSSCH. That is, the SCI may define PSSCH resources on each resource pool. Accordingly, the repetition of the PSSCH on multiple reservations may also improve decoding of the PSSCH.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one or more of the UEs 104 may include a sidelink reception component 140 configured to receive sidelink communications. The sidelink reception component 140 may include a configuration component 142 configured to receive a configuration of multiple resource pools for sidelink communications. The sidelink reception component 140 may include a repetition component 144 configured to receive at least two repetitions of a SCI on at least two of the multiple resource pools. Each repetition of the SCI may include a reservation for a PSSCH on the respective resource pool. The sidelink reception component 140 may include a soft combining component 146 configured to perform soft combining on the at least two repetitions of the SCI to determine resources for the PSSCH. The sidelink reception component 140 may include a decoding component 148 configured to decode the PSSCH based on the SCI.

In an aspect, one or more of the UEs 104 may include a sidelink scheduling component 120 configured to transmit sidelink communications. The sidelink scheduling component 120 may include a configuration component 122 configured to transmit a configuration of multiple resource pools for sidelink communications. The sidelink scheduling component 120 may include a repetition component 124 configured to transmit at least two repetitions of a SCI on at least two of the multiple resource pools. Each repetition of the SCI may include a reservation for a PSSCH on the respective resource pool. The sidelink scheduling component 120 may include a transmission component 126 configured to transmit the PSSCH on each of the multiple resource pools based on the SCI.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

Figure 2:
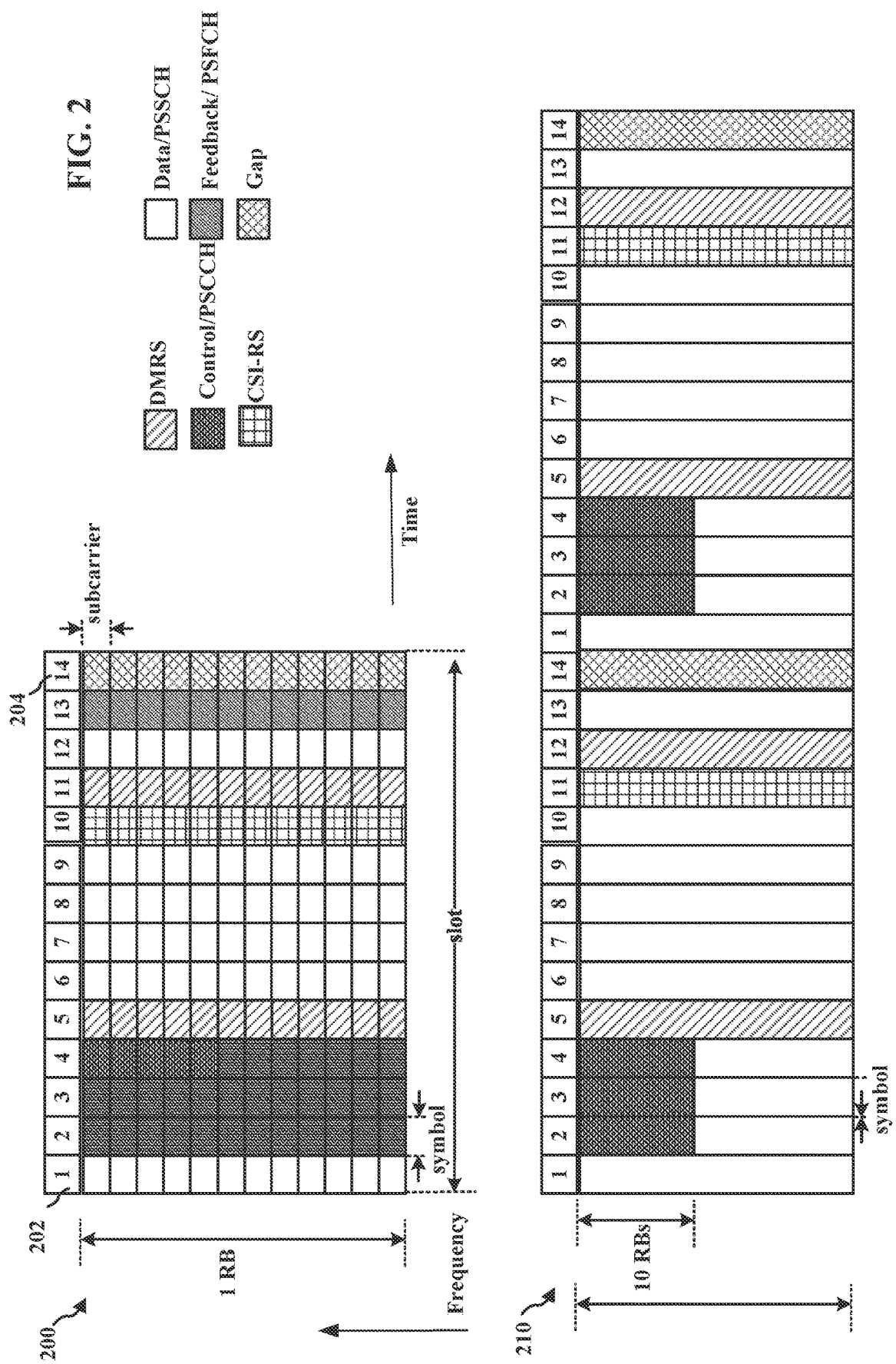
FIG. 2 illustrates an example of a sidelink slot structure.

FIG. 2 illustrates example diagrams 200 and 210 illustrating examples slot structures that may be used for wireless communication between UE 104 and UE 104', e.g., for sidelink communication. The slot structure may be within a 5G NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates multiple slots and RBs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information, e.g., a physical sidelink control channel (PSCCH) along with demodulation RS (DMRS). The control information may include Sidelink Control Information (SCI). The SCI may reserve resources for data, e.g., a physical sidelink shared channel (PSSCH). In NR, PSCCH and PSSCH may be time domain multiplexed. The first symbol 202 in the slot may be for automatic gain control (AGC) for pre-processing the control and/or data information and/or to normalize the incoming signal power. The last symbol 204 may be a gap symbol or guard symbol. At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. The position of any of the SCI, data, and feedback symbols may be different than the example illustrated in FIG. 2.

FIG. 2 also illustrates that symbol(s) may include CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots.

An example of sidelink communication may include cellular vehicle to everything (CV2X) applications. To receive sidelink packets, the receiver (RX) may perform blind decoding in some or all sub-channels. The number of sub-channels may range from, e.g., 1-27 channels. PSCCH and PSSCH may be transmitted within a same slot. PSSCH may occupy up to $N_{subchannel}^{SL}$ contiguous sub-channels. PSCCH may occupy one sub-channel with the lowest sub-channel index. The first-stage SCI (SCI-1) may be transmitted in PSCCH containing information about PSSCH bandwidth and resource reservation in future slots. The second-stage SCI (SCI-2) may be found and decoded after decoding PSCCH. The source identification (ID) and/or destination ID may be used to identify the transmitting UE and the receiving UE of the packet, respectively. The size of the sub-channels in vehicle to everything (V2X) may be 10 or more resource blocks (RBs). In CV2X, the UEs may decode all transmissions and blind decode all sub-channels.

The SCI 1_0 in PSCCH, the frequency domain resource allocation (FDRA) may allocate $$\left\lceil \log \frac{N_{subchannel}^{SL}(N_{subchannel}^{SL}+1)}{2} \right\rceil$$

bits for 2 reservations and $$\left\lceil \log \frac{N_{subchannel}^{SL}(N_{subchannel}^{SL}+1)(2N_{subchannel}^{SL}+1)}{6} \right\rceil$$

bits for 3 reservations. The time domain allocation (TDRA) may allocate 5 bits for 2 reservations and 9 bits for 3 reservations.

In some implementations, PSCCH may be configured or preconfigured to occupy, 10, 12, 15, 20, 25 or other number of RBs, which may be limited to a single sub-channel. PSCCH duration may be configured or preconfigured to 2 or 3 symbols. A sub-channel may occupy 10, 12, 15, 20, 25 or other number of RBs. The number of sub-channels may be 1-27, for example, in a resource pool (RP). PSCCH size may be fixed for a resource pool, such as 10% to 100% of a sub-channel (first 2 or 3 symbols), depending on the configuration. PSSCH may occupy at least 1 sub-channel and/or contain SCI-2.

In CV2X, there may be two methods of resource allocation. In mode 1, the BS (such as a gNB) assigns transmit (TX) resources for sidelink communications through downlink control information, such as DCI 3_0. In mode 2, the transmitting UE may autonomously determine the resources for sidelink communications. The receiving device may behave similarly in mode 1 and mode 2.

Mode 1 may support dynamic grants (DG), configured grants (CG) type 1, and CG type 2. CG type 1 may be activated via radio resource control (RRC) signaling from the BS. DCI 3_0 may be transmitted by the BS to allocate time and frequency resources and indicate transmission timing. The modulation and coding scheme (MCS) may be up to the UE within a limit set by the BS.

During mode 2, the transmitting UE may perform channel sensing by blindly decoding some or all PSCCH channels and identify reserved resources by other sidelink transmissions (if any). The transmitting UE may report available resources to upper layer and the upper layer may decide resource usage.

In some instances of industrial internet of things (IoT), sidelink may enable direct programmable logical controller and sensor/actuator communications. A wireless PLC may be flexible and allow for simple deployment. Each PLC may control a number of SAs, such as 20-50 SAs as an example. Such a scheme may satisfy a tight latency (e.g., 1-2 milliseconds (ms)) and ultra-reliability requirement (e.g., $10^{-6}$ error rate). Communication through one or more BSs may require multiple over the air (OTAs) transmissions, which may negatively impact latency and/or reliability.

Some example traffic characteristics of industrial IoT may be as follows: IoT traffic may typically be deterministic and/or with small packet size (e.g., 32-256 bytes). Since the required bandwidth is low, 2 RBs may be sufficient in some cases. The SAs may have constraints on UE capabilities in terms of bandwidth and processing power. The overall bandwidth may be large (e.g., 100 Megahertz or above) for IoT with dedicated frequency bands and/or unlicensed bands. The SAs may not need to detect and/or monitor all transmissions. PSCCH may be required to meet stringent IoT requirements. The radio frequency (RF) environment may include blockage and/or interference.

Figure 3:
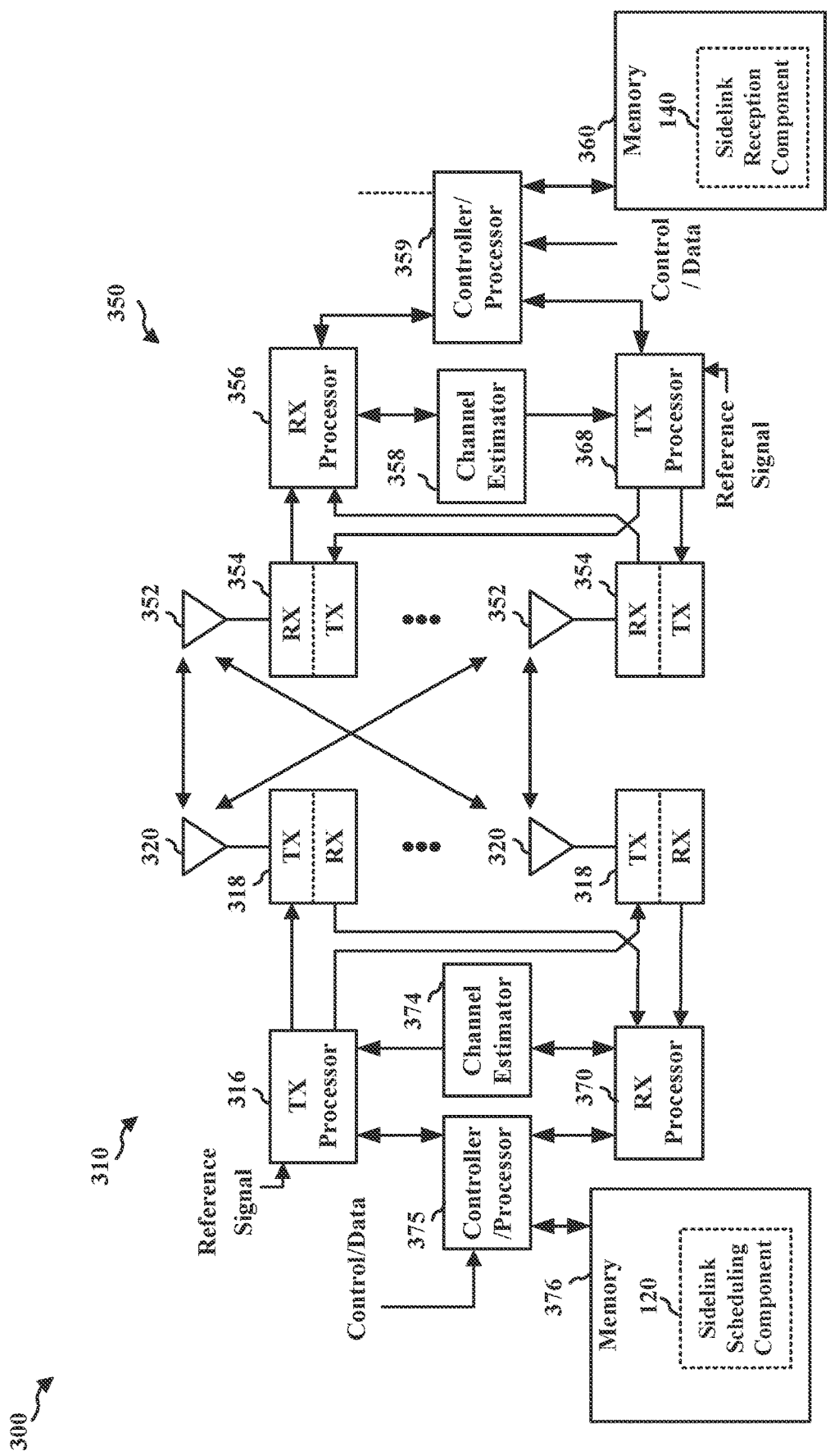
FIG. 3 is a diagram illustrating an example of a base station and user equipment (UE) in an access network.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a RRC layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the sidelink reception component 140 of FIG. 1.

At least one of the TX processor 316, the RX processor 370, and the controller/processor 375 may be configured to perform aspects in connection with the sidelink scheduling component 120 of FIG. 1.

Figure 4:
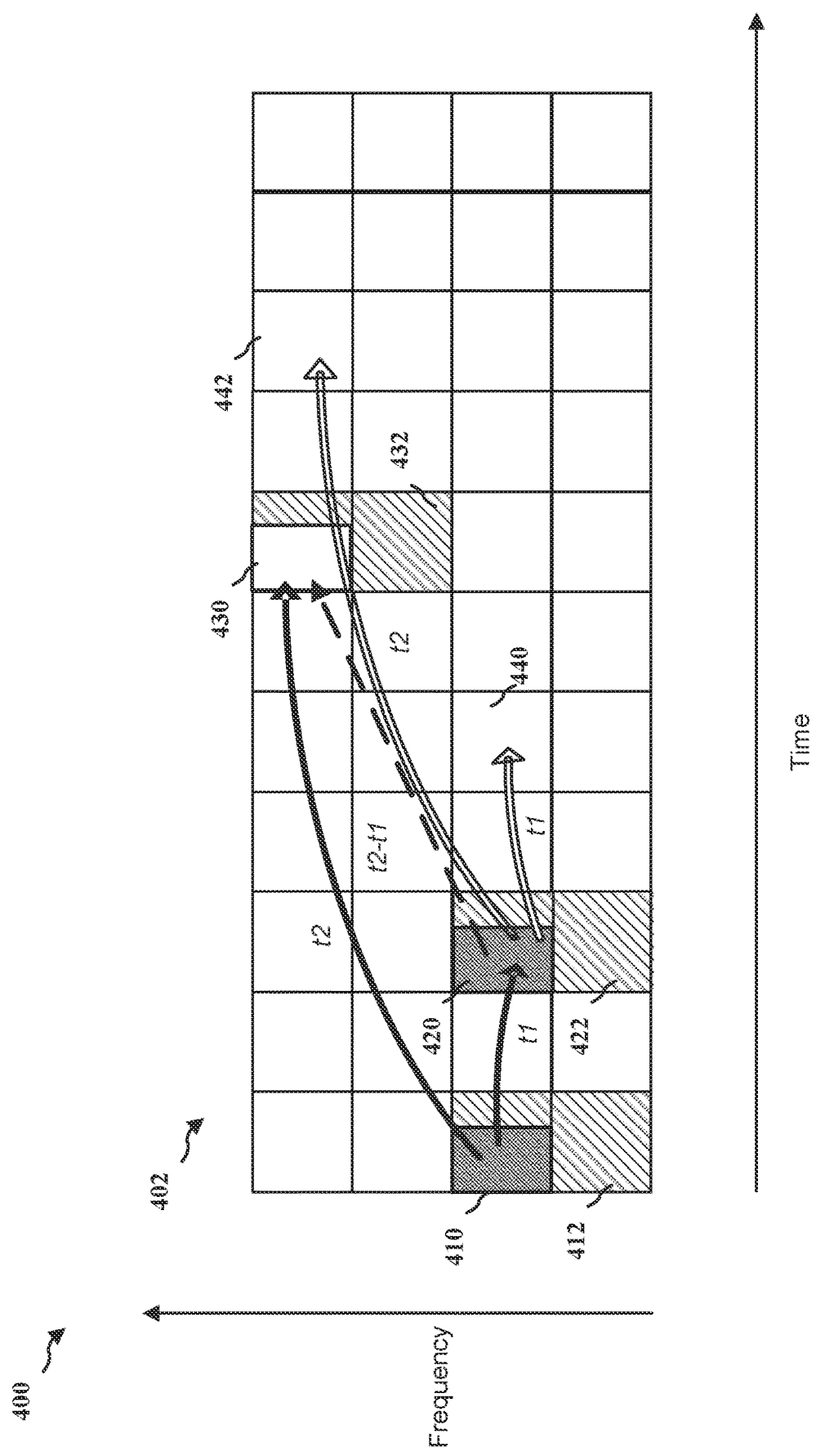
FIG. 4 is a diagram of an example of scheduling reservations with a sidelink control information (SCI).

FIG. 4 is a diagram 400 of an example of scheduling reservations with a SCI 410 assuming a single resource pool 402. The resource pool 402 may include time domain and frequency domain resources. The SCI 410 may include three reservations 412, 422, and 432. The reservation 412 may schedule a PSSCH in the same slot as the SCI 410. The future reservations 422, 432 may be defined in the time domain by offsets t1 and t2. For example, the SCI 410 may include a time domain resource allocation (TDRA) field that defines t1 and t2. The reservations 412, 422, 432 may be defined in the frequency domain by a FDRA field that defines a starting and/or ending subchannel of the frequency resources. The reservations 422, 432 may carry repetitions of the PSSCH transmitted on the reservation 412. A reservation 432 may include a new SCI 430 that provides additional decoding information (e.g., SCI-2) or schedules a different transmission.

Repetition of the SCI 410 may allow soft combining to improve decoding of the SCI 410. If the SCI 410 is repeated as the SCI 420, however, the content of the SCI 410 and the SCI 420 will be the same. Any change of the content of the SCI 410 would prevent effective soft combining. Because the TDRA field of the SCI 420 is the same as the TDRA field of the SCI 410, the TDRA field of the SCI 420 would define the same values for t1 and t2. Accordingly, the SCI 420 would indicate reservations for PSSCH at resources 440 and 442 although no PSSCH transmission occurs on those resources. The SCI 420 would not identify the PSSCH on the reservation 432. Therefore, repetition of a SCI 410 on the same resource pool may result in ambiguity regarding reservations indicated by the repeated SCI 420.

Figure 5:
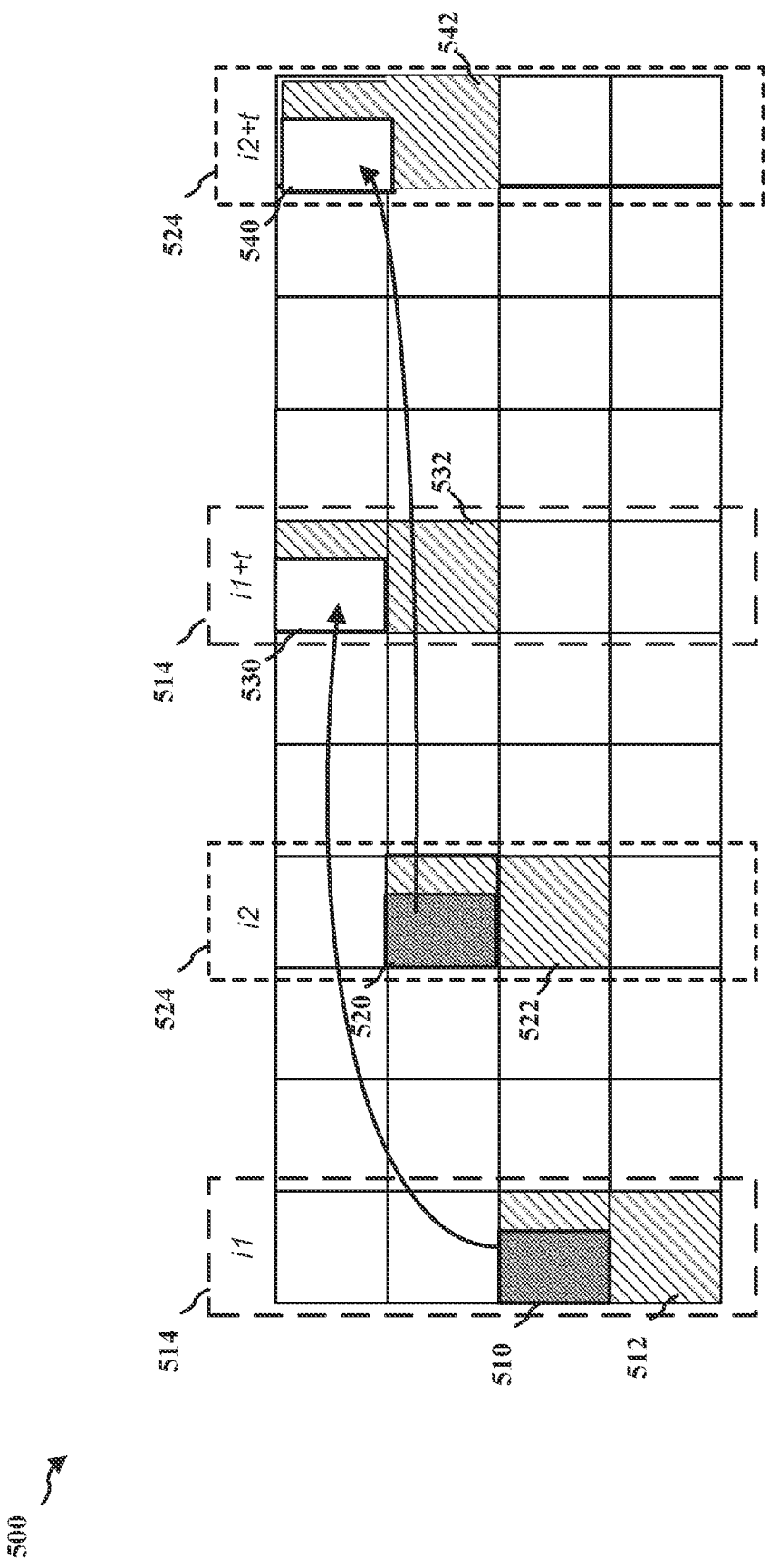
FIG. 5 is a diagram illustrating an example of SCI repetition using multiple resource pools.

FIG. 5 is a diagram 500 illustrating an example of SCI repetition using multiple resource pools. In an aspect, SCI repetition using multiple resource pools may resolve ambiguity regarding the reservation for the repetition of the SCI. A first SCI 510 may be transmitted on a first resource pool 514. For example, the first resource pool 514 may be defined in the time domain by a time domain resource (i1) and a period (t). A second SCI 520 that is a repetition of the first SCI 510 may be transmitted on a second resource pool 524. For example, the second resource pool 524 may be defined in the time domain by a time domain resource (i2) and a period (t). The first SCI 510 may schedule reservation 512 for a PSSCH on the time domain resource i1 and on a future reservation 532 on the first resource pool 514. For example, the TDRA for the first SCI 510 may indicate an offset of t corresponding to the period of the first resource pool 514. The second SCI 520 may be a repetition of the first SCI 510 on the second resource pool 524. Accordingly, the second SCI 520 may schedule a reservation 522 for a PSSCH on the time domain resource i2 and on a second future reservation 542 on the second resource pool 524. In an aspect, the reservation 522, first future reservation 532, and second future reservation 542 may each carry a repetition of the same PSSCH. In some implementations, a subsequent SCI 530, 540 in each resource pool may define different resources for a PSSCH.

In an aspect, a UE may perform soft combining on the first SCI 510 and the second SCI 520. For example, the configuration of the first resource pool 514 and the second resource pool 524 may indicate soft combining of SCIs. For example, the configuration for soft combining may be in response to conditions requiring larger SCI coverage or higher reliability. The configuration may indicate time domain and/or frequency domain resources where the SCIs to be combined are to be received. A legacy UE may be configured with a single resource pool and decode SCI without soft combining.

In an aspect, the first resource pool 514 and the second resource pool 524 may be non-overlapping or orthogonal. For example, if the period t is the same for both the first resource pool 514 and the second resource pool 524, the resources pools will not overlap. For orthogonal resource pools, the number of repetitions of the SCI may be equal to the number of configured resource pools. The use of multiple orthogonal resource pools may increase the number of repetitions of PSSCH. For example, the number of repetitions of PSSCH may be equal to the number of reservations per SCI times the number of configured resource pools. For example, as illustrated in FIG. 5, there are two resource pools and two reservations in each SCI, so there are four repetitions of PSSCH.

FIG. 6 is a diagram 600 of an example of reservations on overlapping resource pools. A first resource pool 614 may be defined in the time domain by a time domain resource (i1) and a period (t1). A second resource pool 524 may be defined in the time domain by a time domain resource (i2) and a period (t2) that is different than t1. Accordingly, the first resource pool 614 and the second resource pool 624 may overlap on an overlapping resource 634. Overlapping time domain resources may fully or partially overlap in the frequency domain. In an aspect, the TDRA of the SCI 610 may be defined in logical slots of the respective resource pool. The SCI 610 may schedule a reservation 612 on the first resource pool 614 and a future reservation 632 on the overlapping resource 634. When the SCI 610 on the first resource pool 614 is repeated on the second resource pool 624 as SCI 620, the SCI 620 may schedule a reservation 622 on the second resource pool 624 and the future reservation 632 on the overlapping resource 634 (e.g., with a logical slot offset of 1). Accordingly, because the TDRA defines the offset for a future reservation using a logical slot for the resource pool, the repeated SCI 610, 620 may unambiguously identify the same physical resource of the overlapping resource 634.

FIG. 7 is a diagram 700 of an example of multiple reservations on overlapping resource pools. The SCI 710 on the first resource pool 714 may schedule a reservation 712 on the first resource pool 714 and two future reservations 732 and 742 on overlapping resources 734, 744. For example, the TDRA field of SCI 710 may indicate t1 and t2. The SCI 710 may be repeated as SCI 720 on the second resource pool 714. Based on the logical slots defined for the second resource pool 724, the SCI 720 may schedule the reservation 722 on the second resource pool 724 and the two future reservations 732 and 742 on an overlapping resource 734.

In an aspect, overlapping resource pools may be designed to provide different levels of repetition for both SCI and PSSCH. For example, with more than two resource pools, the number of overlapping resources may be limited to allow a greater ratio of SCIs to PSSCH. For instance, with four resource pools (e.g., RP 1, 2, 3, and 4), the number of overlapping resources may be limited to one overlapping resource for all four resource pools. An SCI may be transmitted on a non-overlapping or orthogonal resource in each of the four resource pools and each SCI may schedule a reservation on the overlapping resource. Accordingly, the SCI may be repeated 4 times and the PSSCH may be repeated 5 times. As another example, the ratio of SCIs to PSSCH may be decreased by allowing more overlapping slots. In a second example, one overlapping resource may belong to RP 1 and 2 but not RP 3 and 4, and another overlapping resource may belong to RP 3 and 4 but not RP 1 and 2. Accordingly, the SCI on RP 3 and 4 may schedule a different reservation than the SCI on RP 1 and 3. Accordingly, this configuration of overlapping resources may result in the SCI being repeated 4 times and the PSSCH being repeated 6 times. Accordingly, configuration of a number of overlapping resources may be used to select the number of SCI repetitions and the number of PSSCH repetitions.

In an aspect, overlapping resource pools may result in ambiguity for an SCI on the overlapping resource. A rule may define how a TDRA in the SCI on the overlapping resource is to be interpreted. For example, a first rule may indicate that an SCI 630 on an overlapping resource 634 may not schedule a future reservation. The SCI 630 may not be a repetition of the SCI 610. The rule may further define whether an SCI reservation of a future resource is interpreted as invalid. For example the rule may indicate whether aperiodic reservations or periodic reservations are invalid. For instance, aperiodic reservations may be invalid, but periodic reservations may be valid. For an invalid reservation, a value of a TDRA field in the SCI 630 may be ignored. If the maximum reservations per SCI is 2, the number of SCI repetitions may be equal to the number of PSSCH repetitions. For example, the SCI 630 may be a repetition of the SCI 610. If the maximum reservations per SCI is 3 as in FIG. 7, the number of PSSCH repetitions (e.g., 4) may be greater than the number of SCI repetitions (e.g., 2). The SCIs 730 and 740 may not be a repetition of the SCI 710.

As another example, a second rule may indicate that the reservation for each resource pool on the overlapping resource is valid. The SCI on the overlapping resource, however, may not be repeated on the reservation. Accordingly, the number of SCI repetitions may be fewer than the number of PSSCH repetitions.

FIG. 8 is a diagram of an example of a SCI 810 on an overlapping resource 814. The SCI 810 may schedule the PSSCH 812. According to the second rule, a reservation on in the SCI 810 may schedule both the PSSCH 822 and the PSSCH 832. The SCI 820 and the SCI 830 may be different than the SCI 810 (i.e., not repeated).

As another example, a third rule may indicate that an SCI on the overlapping resource 814 signals a subset of the resource pools for a reservation. For example, a configuration of the resource pools may define a DMRS scrambling ID or DMRS frequency domain orthogonal cover code (FD-OCC) code for the SCI 810 associated with a subset of the resource pools. A UE may determine the associated subset of resource pools based on the DMRS scrambling ID or DMRS FD-OCC on which the DMRS of the SCI 810 is received. For example, in FIG. 8, the DMRS scrambling ID or DMRS FD-OCC of the SCI 810 may indicate the first resource pool 824, and the SCI 810 may only schedule the PSSCH 822. In contrast, a different DMRS scrambling ID or DMRS FD-OCC of the SCI 810 may indicate the second resource pool 834, and the SCI 810 may only schedule the PSSCH 832.

In an aspect, the rule defining how a TDRA in the SCI on the overlapping resource is to be interpreted may be defined by a standards document or regulation or signaled by the network. For instance, an upper layer message can further configure a UE to apply the first, second or third rule. If the first rule is indicated, the message may indicate whether periodic and/or aperiodic reservations are valid on the repeated SCI. If the third rule is indicated, RRC or PC5 signaling from upper layers or from the base station may configure the UE regarding resource reservation on overlapping resource. For example, an RRC message may configure a table that maps between scrambling ID or FD_OCC and corresponding RP of reservation.

Figure 9:
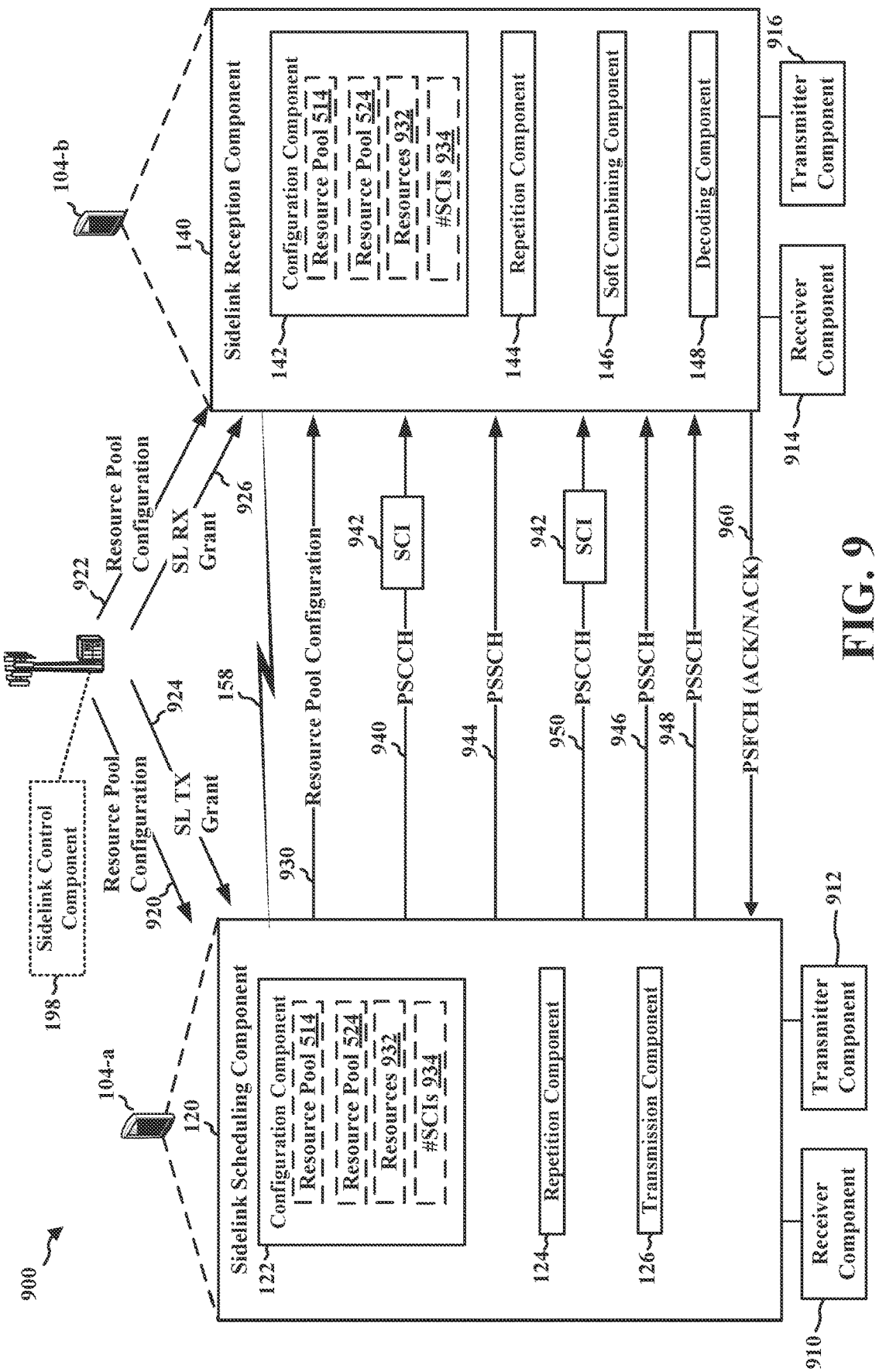
FIG. 9 is a diagram illustrating example communications and components of a base station, a first UE, and a second UE.

FIG. 9 is a diagram 900 illustrating example communications and components of a base station 102, a first UE 104-a, and a second UE 104-b. As illustrated, the first UE 104-a may transmit sidelink communications to the second UE 104-b. The first UE 104-a may include a sidelink scheduling component 120 and the second UE 104-b may include a sidelink reception component 140. In some implementations, the first UE 104-a and the second UE 104-b may each include both of the sidelink scheduling component 120 and the sidelink reception component 140. For simplicity of explanation, a resource pool configuration corresponding to FIG. 5 is described with respect to FIG. 9. It should be appreciated that the resource pools configurations described in FIGS. 6-8 are also applicable to FIG. 9.

As discussed above regarding FIG. 1, the first UE 104-a including the sidelink scheduling component 120 may include the configuration component 122, the repetition component 124, and the transmission component 126. The first UE 104-a may also include a receiver component 910 and a transmitter component 912. The receiver component 910 may include, for example, a RF receiver for receiving the signals described herein. The transmitter component 912 may include, for example, an RF transmitter for transmitting the signals described herein. In an aspect, the receiver component 910 and the transmitter component 912 may be implemented as a transceiver such as the TX/RX 318 in FIG. 3.

The second UE 104-b may include the sidelink reception component 140. The sidelink reception component 140 may include the configuration component 142, the repetition component 144, the soft combining component 146, and the decoding component 148 as discussed above with respect to FIG. 1. The second UE 104-b may also include a receiver component 914 and a transmitter component 916. The receiver component 914 may include, for example, a RF receiver for receiving the signals described herein. The transmitter component 916 may include, for example, an RF transmitter for transmitting the signals described herein. In an aspect, the receiver component 914 and the transmitter component 916 may be implemented as a transceiver such as the TX/RX 354 in FIG. 3.

The base station 102 may include the sidelink control component 198. In some implementations, the base station 102 may transmit a transmission resource pool configuration 920 to the first UE 104-a and/or transmit a reception resource pool configuration 922 the second UE 104-b. The resource pool configurations 920, 922 may define the multiple resource pools (e.g., resource pool 514 and 524) for the receiving UE 104-b. For instance, the resource pool configuration 920, 922 may be a RRC configuration message. In some implementations, for mode 1 scheduling, the base station 102 may transmit a SL TX grant 924 to the first UE 104-a and transmit a sidelink receive grant 926 to the second UE 104-b. For example, the grants 924, 926 may be DCI carried on the PDCCH. The configuration component 142 at each of the first UE 104-a and the second UE 104-b may receive the respective resource pool configuration 920, 922, and/or the respective grant 924, 926.

The first UE 104-a and the second UE 104-b may communicate via the communication link 158, which may be referred to as a direct link or the sidelink. In some implementations, the first UE 104-a may transmit a resource pool configuration 930 to the second UE 104-b. The resource pool configuration 930 may configure multiple resource pools (e.g., resource pools 514 and 524) for sidelink communications. In some implementations, the resource pool configuration 930 may be an alternative to the resource pool configuration 922. That is, the first UE 104-a may configure the multiple resource pools for the second UE 104-b. The resource pool configuration 930 may provide additional information regarding SCI repetition. For example, the resource pool configuration 930 may indicate time and frequency resources 932 for the repeated SCIs including a number of the repeated SCIs 934. The configuration component 122 at the first UE 104-a and the configuration component 142 at the second UE 104-b may store the resource pool configuration 930.

The UE 104-a may transmit a PSCCH 940, which may carry an SCI 942 on a first resource pool 514. The SCI 942 may correspond to, for example, the first SCI 510. The SCI 942 may include up to three reservations, for example, for PSSCHs 944, 946, and 948. In some implementations, the PSSCH 944 may be transmitted on the first resource pool 514 in the same slot at the SCI 942. The PSSCH 946 and PSSCH 948 may be transmitted on different resource pools or overlapping resources of the first resource pool as illustrated in FIGS. 5-8.

In some implementations, the second UE 104-b may attempt to decode the SCI 942. In some cases, e.g., where channel conditions are poor, the second UE 104-b may fail to decode the SCI 942 on the PSCCH 940. Accordingly, the second UE 104-b could potentially miss the PSSCHs 944, 946, and 948. As discussed above, SCI repetition may improve reliability of the SCI 942. For instance, the first UE 104-a may transmit the PSCCH 950, which may carry a repetition of the SCI 942 on the second resource pool 524. The repetition component 144 at the second UE 104-b may receive each of the repetitions of the SCI 942. The soft combining component 146 at the second UE 104-b may perform soft combining on the repetitions of the SCI 942 to determine resources for the PSSCHs 944, 946, and 948. That is, the soft combining may allow successful decoding of the SCI 942. The soft combining component 146 at the second UE 104-b may then apply the decoded SCI 942 (e.g., the TDRA field) to the resources of each repetition of the SCI 942 to determine the resources for the PSSCHs 944, 946, and 948. In some implementations, the PSSCHs 944, 946, and 948 may be repetitions such that the decoding component 148 is able to decode the PSSCH based on the SCI. The second UE 104-b may transmit a PSFCH 960 indicating a decoding status (e.g., ACK/NACK) for the PSSCH.

Figure 10:
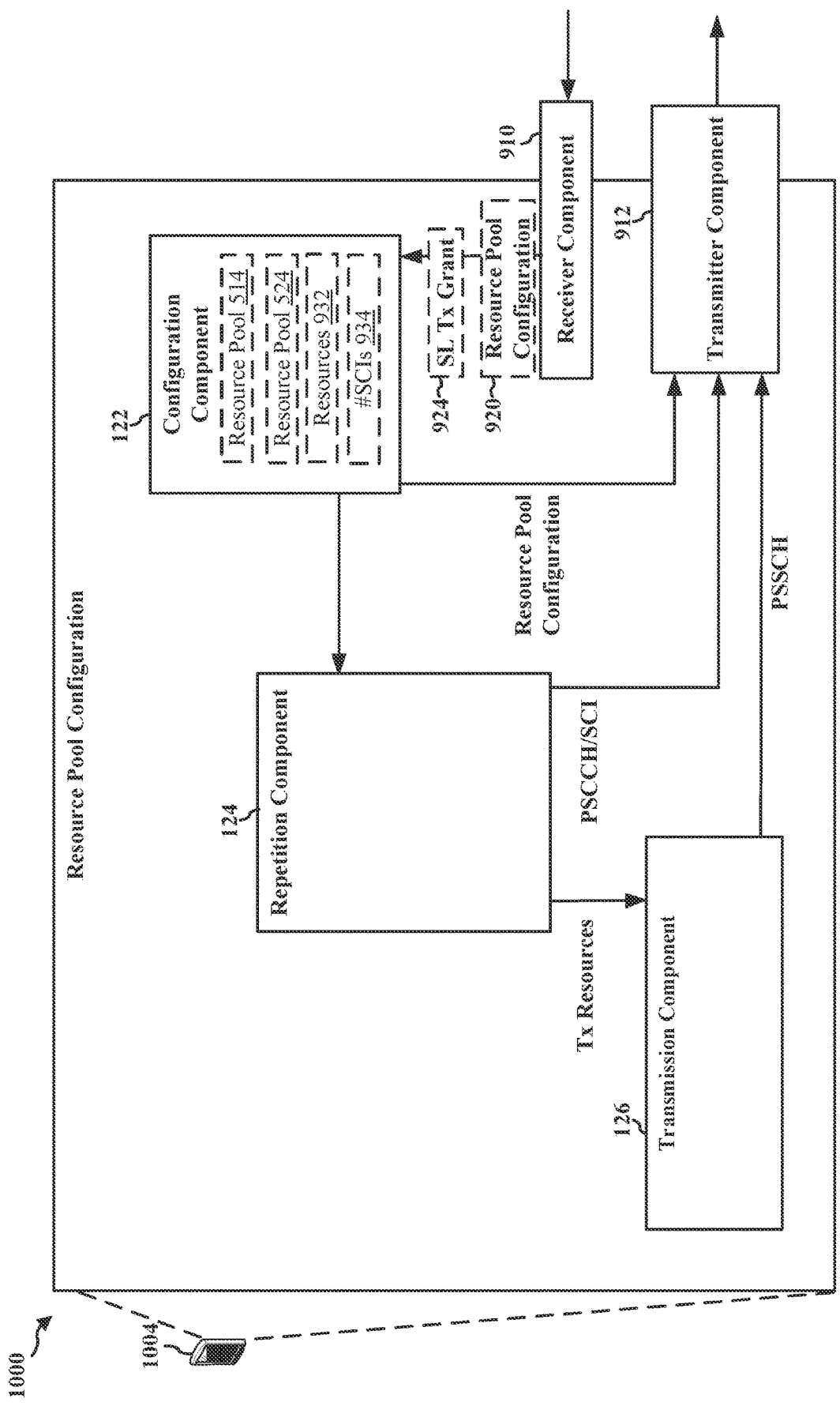
FIG. 10 is a conceptual data flow diagram illustrating the data flow between different means/components in an example UE for sidelink transmissions.

FIG. 10 is a conceptual data flow diagram 1000 illustrating the data flow between different means/components in an example UE 1004, which may be an example of the first UE 104-a including the sidelink scheduling component 120.

The receiver component 910 may receive downlink signals such as the resource pool configuration 920 and/or the SL TX grant 924. The receiver component 910 may pass the resource pool configuration 920 and/or the SL TX grant 924 to configuration component 122.

The configuration component 122 may be configured to transmit and/or receive a configuration of multiple resource pools for sidelink communications. For example, in some implementations, the configuration component 122 may receive the resource pool configuration 920 from a base station 102 via the receiver component 910. In some implementations, the configuration component 122 may generate a resource pool configuration 930. For example, the configuration component 122 may generate the resource pool configuration 930 based on the resource pool configuration 920. For instance, the resource pool configuration 920 may include the resource pool 514 and the resource pool 524 for transmission and the configuration component 122 may select the resources 932 and the number of SCIs 934. In some implementations, the configuration component 122 may autonomously generate the resource pool configuration 920, for example, when the UE 104-a provides a service without base station support. The configuration component 122 may provide the resource pool configuration 930 to the transmitter component 912. The configuration component 122 may provide the resource pool 514, the resource pool 524, the resources 932, and/or the number of SCIs 934 to the repetition component 124.

The repetition component 124 may be configured to transmit at least two repetitions of a SCI on at least two of the multiple resource pools. The repetition component 124 may receive the receive the resource pool 514, the resource pool 524, the resources 932, and/or the number of SCIs 934 from the configuration component 122. The repetition component 124 may generate the SCI 942 including a reservation for the PSSCHs on the multiple resource pools. The repetition component 124 may transmit the same SCI 942 on the resources 932 for the number of SCIs 934. For example, the repetition component 124 may provide the SCI 942 to the transmitter component 912 for each of the resources 932. The repetition component 124 may also provide the transmission resources indicated by the reservation of the SCI 942 to the transmission component 126

The transmission component 126 may be configured to transmit the PSSCH on each of the multiple resource pools based on the SCI. For example, the transmission component 126 may receive the SCI 942 or the resources indicated by the SCI 942 from the repetition component 124. The transmission component 126 may generate the PSSCHs 944, 946, 948 based on the SCI 942. The transmission component 126 may provide the PSSCHs 944, 946, 948 to the transmitter component 912.

Figure 11:
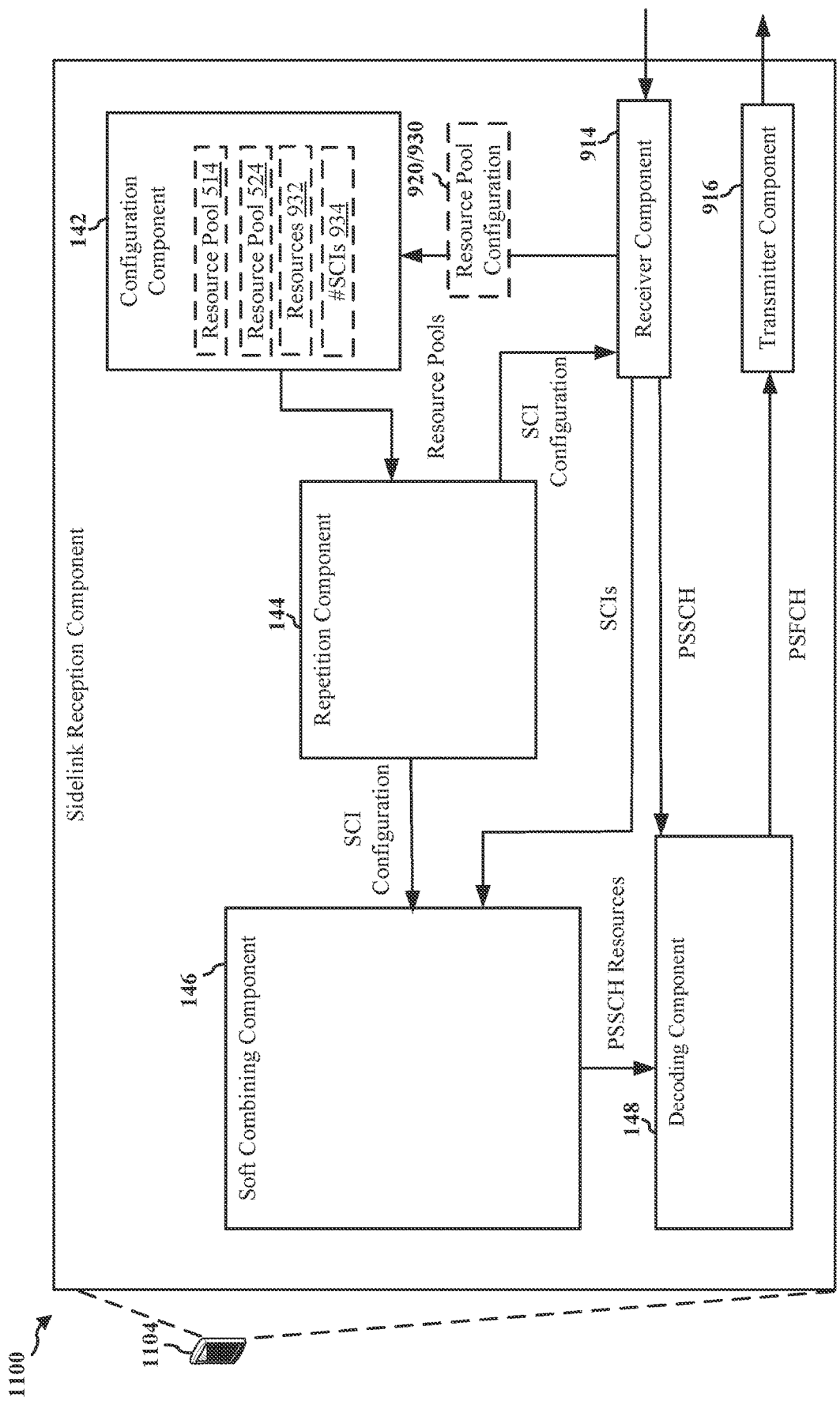
FIG. 11 is a conceptual data flow diagram illustrating the data flow between different means/components in an example UE for sidelink reception.

FIG. 11 is a conceptual data flow diagram 1100 illustrating the data flow between different means/components in an example UE 1104, which may be an example of the second UE 104-b including the sidelink reception component 140.

The receiver component 914 may receive downlink signals such as the resource pool configuration 920, 930 and/or the SL RX grant 926. The receiver component 914 may pass the resource pool configuration 920, 930 and/or the SL RX grant 926 to configuration component 142. The receiver component 914 may receive sidelink signals such as the PSCCH and PSSCH. The receiver component 914 may pass the PSSCH and/or SCIs to the soft combining component 146. The receiver component 914 may pass the PSSCH to the decoding component 148.

The configuration component 142 may be configured to receive a configuration of multiple resource pools for sidelink communications. For example, the configuration component 142 may receive the resource pool configuration 920 from a base station 102 and/or may receive the resource pool configuration 920 from the first UE 104-a. The configuration component 142 may extract configuration parameters such as the resource pool 514, the resource pool 524, the resources 932, and/or the number of SCIs 934 from the resource pool configuration 920, 930. For example, the configuration component 142 may decode a higher layer message (e.g., a RRC configuration) and extract information elements. The configuration component 142 may provide the configuration parameters to the repetition component 144.

The repetition component 144 may be configured to receive at least two repetitions of a SCI on at least two of the multiple resource pools. The repetition component 144 may receive the resource pool configuration parameters from the configuration component 142. The repetition component 144 may configure the receiver component 914 with an SCI configuration to receive the at least two repetitions of the SCI. For example, the repetition component 144 may determine physical resources included in each of the resource pools. The repetition component 144 may configure the receiver component 914 to provide signals received on the physical resources to the repetition component 144 and/or the soft combining component 146. The repetition component 144 may also provide the SCI configuration to the soft combining component 146.

The soft combining component 146 may be configured to perform soft combining on the at least two repetitions of the SCI to determine resources for the PSSCH. The soft combining component 146 may receive the at least two repetitions of the SCI from the receiver component 914. The soft combining component 146 may combine the signals for each of the repetitions of the SCI prior to decoding the SCI. For example, the soft combining component 146 may utilize maximum-ratio combining to combine the received bits of the repetitions with the same bits from previous transmissions. The soft combining component 146 may decode the SCI 942 to determine resources for the PSSCH. For example, the soft combining component 146 may determine the TDRA field as well as a FDRA field of the SCI 942. The soft combining component 146 may apply the TDRA field and the FDRA field to the resources for each repetition of the SCI 942 and corresponding resource set to determine the PSSCH resources (e.g., for PSSCH 944, 946, 948). The soft combining component 146 may provide the PSSCH resources to the decoding component 148.

The decoding component 148 may be configured to decode the PSSCH based on the SCI. The decoding component 148 may receive the PSSCH resources and/or the decoded SCI from the soft combining component 146. For example, the decoded SCI may be an SCI-1 for sidelink that includes a priority, the FDRA, the TDRA, a resource reservation period, a DM-RS pattern, an SCI-2 format, a beta offset for SCI-2 rate matching, a DM-RS port, a MCS, an additional MCS table, a PSFCH overhead indicator, and reserved bits. In some implementations, the PSSCH 944, 946, 948 may include an SCI-2. The SCI-2 may include a HARQ ID, a new data indicator (NDI), a redundancy version (RV) identifier, a source ID, a destination ID, a HARQ enable/disable bit, a cast type, a CSI request, a zone ID, or a communication range. The decoding component 148 may use the parameters from the SCI-1 and the SCI-2 to decode each of the PSSCH 944, 946, 948. In some implementations, the PSSCH is repeated on the reservation for each repetition of the SCI. Accordingly, the decoding component 148 may utilize soft combining when the PSSCHs 944, 946, 948 are repetitions.

Figure 12:
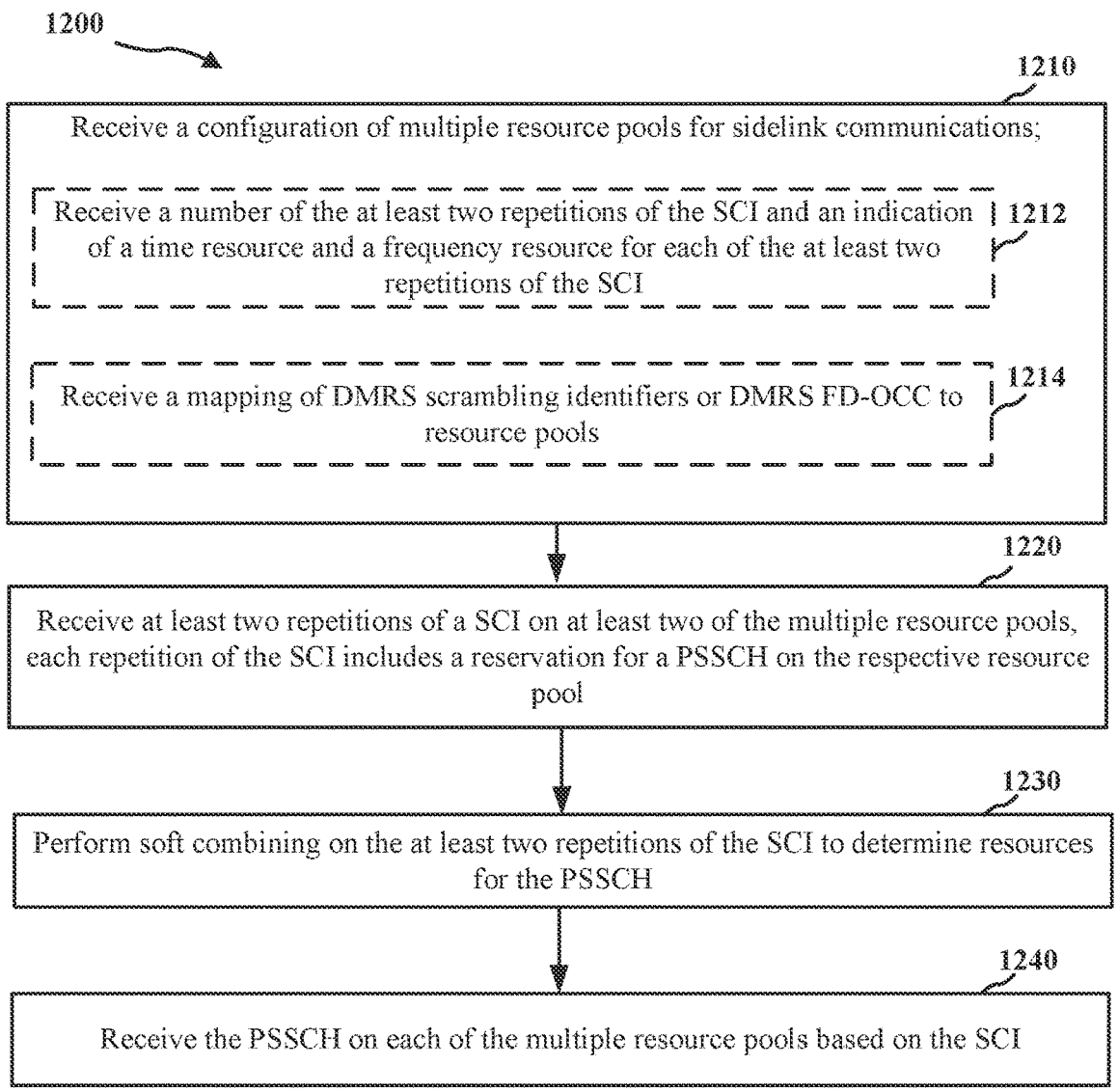
FIG. 12 is a flowchart of an example of a method of receiving a sidelink communication based on a repeated SCI.

FIG. 12 is a flowchart of an example method 1200 for operating a receiving UE 104-b for sidelink reception. The method 1200 may be performed by a UE (such as the UE 104, which may include the memory 360 and which may be the entire UE 104 or a component of the UE 104 such as the sidelink reception component 140, TX processor 368, the RX processor 356, or the controller/processor 359). The method 1200 may be performed by the sidelink reception component 140 in communication with the sidelink control component 198 of the base station 102 and the sidelink scheduling component 120 of another UE 104.

At block 1210, the method 1200 may include receiving a configuration of multiple resource pools for sidelink communications. In an aspect, for example, the UE 104, the RX processor 356 and/or the controller/processor 359 may execute the sidelink reception component 140 and/or the configuration component 142 to receive a configuration of multiple resource pools for sidelink communications. In an aspect, at sub-block 1212, the block 1210 may include receiving a number of the at least two repetitions of the SCI (e.g., the number of SCIs 934) and an indication of a time resource and a frequency resource (e.g., resources 932) for each of the at least two repetitions of the SCI. In another aspect, at sub-block 1214, the block 1210 may include receiving a mapping of DMRS scrambling identifiers or DMRS FD-OCCs to resource pools. Accordingly, the UE 104, the RX processor 356, and/or the controller/processor 359 executing the sidelink reception component 140 and/or the configuration component 142 may provide means for receiving a configuration of multiple resource pools for sidelink communications.

At block 1220, the method 1200 may include receiving at least two repetitions of a SCI on at least two of the multiple resource pools. Each repetition of the SCI may include a reservation for a PSSCH on the respective resource pool. In an aspect, for example, the UE 104, the RX processor 356 and/or the controller/processor 359 may execute the sidelink reception component 140 and/or the repetition component 144 to receive at least two repetitions of a SCI 942 on at least two of the multiple resource pools 514, 524. Each repetition of the SCI 942 may include a reservation for a PSSCH (e.g., reservations 512, 522, 532, 542) on the respective resource pool. In some implementations, a first resource pool 514 of the multiple resource pools does not overlap with a second resource pool 524 of the multiple resource pools. A number of the at least two repetitions (e.g., the number of SCIs 934 equals 2) is equal to a number of the multiple resource pools (e.g., 2), for example, as illustrated in FIG. 5. In another implementation (e.g., in FIGS. 6 and 7), a first resource pool 614, 714 of the multiple resource pools overlaps with a second resource pool 624, 724 of the multiple resource pools on at least some overlapping resources 634, 734. In some implementations, as illustrated in FIGS. 6 and 7, a reservation in the SCI 630 on the overlapping resource 634, 734 is invalid. In some implementations, as illustrated in FIG. 8, a reservation in the SCI 810 on the overlapping resources 814 indicates a PSSCH 822 on the first resource pool 824 and a PSSCH 832 on the second resource pool 834. In some implementations, e.g., where sub-block 1214 is performed, a DMRS scrambling identifier for the SCI 810 or a DMRS FD-OCC for the SCI 810 indicates whether a PSSCH 822, 832 is scheduled on the first resource pool 824 or the second resource pool 834. Accordingly, the UE 104, the RX processor 356, and/or the controller/processor 359 executing the sidelink reception component 140 and/or the configuration component 142 may provide means for receiving at least two repetitions of a SCI on at least two of the multiple resource pools.

At block 1230, the method 1200 may include performing soft combining on the at least two repetitions of the SCI to determine resources for the PSSCH. In an aspect, for example, the UE 104, the RX processor 356 and/or the controller/processor 359 may execute the sidelink reception component 140 and/or the soft combining component 146 to perform soft combining on the at least two repetitions of the SCI 942 (e.g., SCI 510 and SCI 520) to determine resources for the PSSCH. Accordingly, the UE 104, the RX processor 356, and/or the controller/processor 359 executing the sidelink reception component 140 and/or the soft combining component 146 may provide means for performing soft combining on the at least two repetitions of the SCI to determine resources for the PSSCH.

At block 1240, the method 1200 may include decoding the PSSCH based on the SCI. In an aspect, for example, the UE 104, the TX processor 368 and/or the controller/processor 359 may execute the sidelink reception component 140 and/or the decoding component 148 to decode the PSSCH based on the SCI. In some implementations, the PSSCH is repeated on the reservation for each repetition of the SCI. For example, in FIG. 5, the same PSSCH may be repeated on each of the reservations 512, 522, 532, and 542. Accordingly, the UE 104, the RX processor 356, and/or the controller/processor 359 executing the sidelink reception component 140 and/or the decoding component 148 may provide means for decoding the PSSCH based on the SCI.

Figure 13:
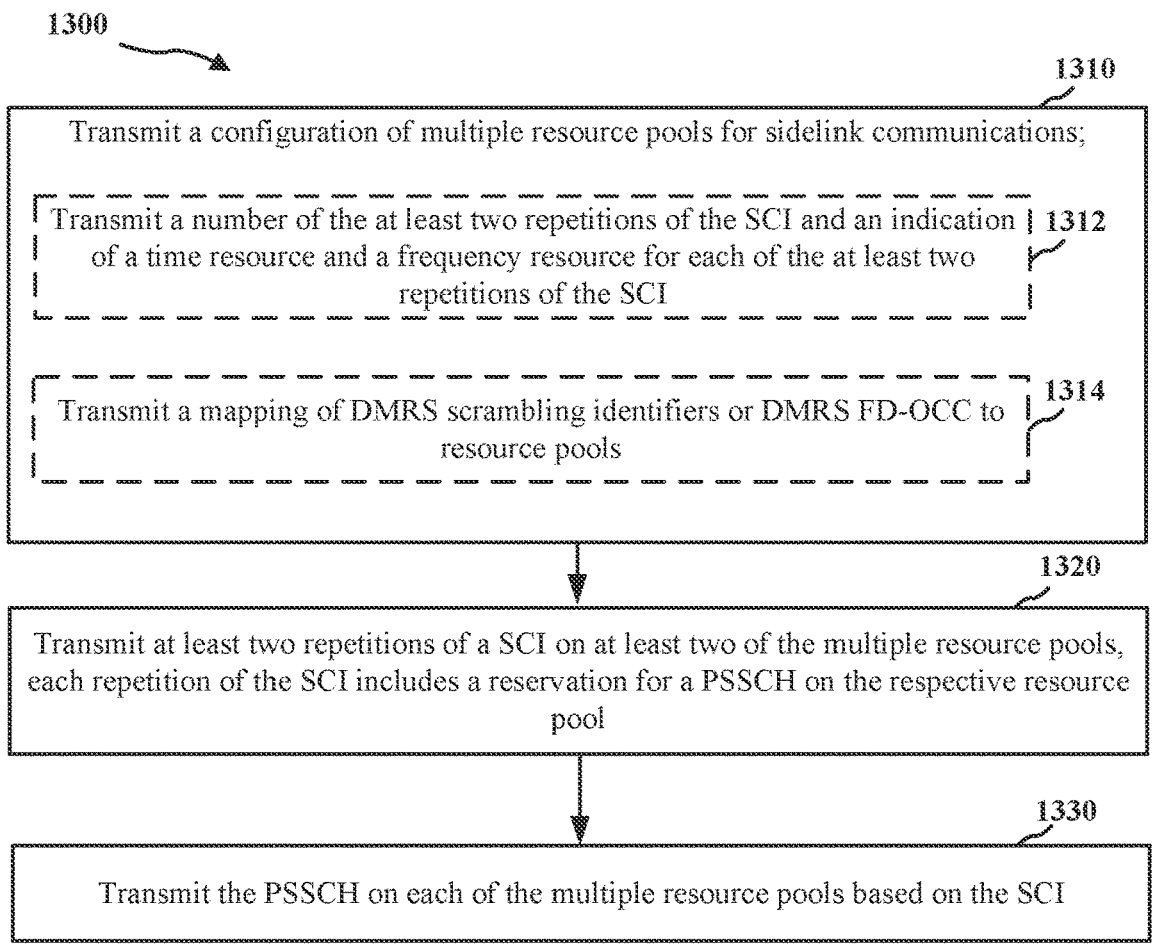
FIG. 13 is a flowchart of an example of a method of transmitting a sidelink communication based on a repeated SCI.

FIG. 13 is a flowchart of an example method 1300 for operating a transmitting UE 104-a for sidelink transmission. The method 1300 may be performed by a UE (such as the UE 104 or transmitting device 310) which may include the memory 376 and which may be the entire UE 104 or a component of the UE 104 such as the sidelink scheduling component 120, TX processor 316, the RX processor 370, or the controller/processor 375. The method 1300 may be performed by the sidelink scheduling component 120 in communication with the sidelink control component 198 of the base station 102 and the sidelink reception component 140 of another UE 104.

At block 1310, the method 1300 may include transmitting a configuration of multiple resource pools for sidelink communications. In an aspect, for example, the UE 104, the TX processor 316 and/or the controller/processor 375 may execute the sidelink scheduling component 120 and/or the configuration component 122 to transmit a configuration of multiple resource pools for sidelink communications. In an aspect, at sub-block 1312, the block 1310 may include transmitting a number of the at least two repetitions of the SCI (e.g., the number of SCIs 934) and an indication of a time resource and a frequency resource (e.g., resources 932) for each of the at least two repetitions of the SCI. In another aspect, at sub-block 1314, the block 1310 may include transmitting a mapping of DMRS scrambling identifiers or DMRS FD-OCCs to resource pools. Accordingly, the UE 104, the TX processor 316, and/or the controller/processor 375 executing the sidelink scheduling component 120 and/or the configuration component 122 may provide means for transmitting a configuration of multiple resource pools for sidelink communications.

At block 1320, the method 1300 may include transmitting at least two repetitions of a SCI on at least two of the multiple resource pools. Each repetition of the SCI includes a reservation for a PSSCH on the respective resource pool. In an aspect, for example, the UE 104, the TX processor 316 and/or the controller/processor 375 may execute the sidelink scheduling component 120 and/or the repetition component 124 to transmit at least two repetitions of a sidelink control information (SCI) on at least two of the multiple resource pools. Accordingly, the UE 104, the TX processor 316, and/or the controller/processor 375 executing the sidelink scheduling component 120 and/or the repetition component 124 may provide means for transmitting at least two repetitions of a sidelink control information (SCI) on at least two of the multiple resource pools.

At block 1330, the method 1300 may include transmitting the PSSCH on each of the multiple resource pools based on the SCI. In an aspect, for example, the UE 104, the TX processor 316 and/or the controller/processor 375 may execute the sidelink scheduling component 120 and/or the transmission component 126 to transmit the PSSCH on each of the multiple resource pools based on the SCI. Accordingly, the UE 104, the TX processor 316, and/or the controller/processor 375 executing the sidelink scheduling component 120 and/or the transmission component 126 may provide means for transmitting the PSSCH on each of the multiple resource pools based on the SCI.

Some Further Example Clauses

1. A method of wireless communication, comprising:
   receiving a configuration of multiple resource pools for sidelink communications;
   receiving at least two repetitions of a sidelink control information (SCI) on at least two of the multiple resource pools, each repetition of the SCI includes a reservation for a physical sidelink shared channel (PSSCH) on the respective resource pool;
   performing soft combining on the at least two repetitions of the SCI to determine resources for the PSSCH; and
   decoding the PSSCH based on the SCI.
2. The method of clause 1, wherein receiving the configuration of the multiple resource pools for sidelink communications comprises receiving a number of the at least two repetitions of the SCI and an indication of a time resource and a frequency resource for each of the at least two repetitions of the SCI.
3. The method of clause 1 or 2, wherein the PSSCH is repeated on the reservation for each repetition of the SCI.
4. The method of any of clauses 1-3, wherein a first resource pool of the multiple resource pools does not overlap with a second resource pool of the multiple resource pools.
5. The method of clause 4, wherein a number of the at least two repetitions is equal to a number of the multiple resource pools.
6. The method of any of clauses 1-3, wherein a first resource pool of the multiple resource pools overlaps with a second resource pool of the multiple resource pools on at least some overlapping resources.
7. The method of clause 6, wherein a reservation in the SCI on the overlapping resources is invalid.
8. The method of clause 6, wherein a reservation in the SCI on the overlapping resources indicates a PSSCH on the first resource pool and a PSSCH on the second resource pool.
9. The method of clause 6, wherein a reservation in the SCI on the overlapping resources indicates whether a PSSCH is scheduled on the first resource pool or the second resource pool.
10. The method of clause 9, wherein a demodulation reference signal (DMRS) scrambling identifier for the SCI or a DMRS frequency domain orthogonal cover code (FD-OCC) for the SCI indicates whether a PSSCH is scheduled on the first resource pool or the second resource pool.
11. The method of clause 10, wherein receiving the configuration of the multiple resource pools for sidelink communications comprises receiving a mapping of DMRS scrambling identifiers or DMRS FD-OCCs to resource pools.
12. A method of wireless communication, comprising:
   transmitting a configuration of multiple resource pools for sidelink communications;
   transmitting at least two repetitions of a sidelink control information (SCI) on at least two of the multiple resource pools, each repetition of the SCI includes a reservation for a physical sidelink shared channel (PSSCH) on the respective resource pool; and transmitting the PSSCH on each of the multiple resource pools based on the SCI.

13. The method of clause 12, wherein transmitting the configuration of the multiple resource pools for sidelink communications comprises transmitting a number of the at least two repetitions of the SCI and an indication of a time resource and a frequency resource for each of the at least two repetitions of the SCI.

14. The method of clause 12 or 13, wherein the PSSCH is repeated on the reservation for each repetition.

15. The method of any of clauses 12-14, wherein a first resource pool of the multiple resource pools does not overlap with a second resource pool of the multiple resource pools.

16. The method of clause 15, wherein a number of the at least two repetitions is equal to a number of the multiple resource pools.

17. The method of any of clauses 12-14, wherein a first resource pool of the multiple resource pools overlaps with a second resource pool of the multiple resource pools on at least some overlapping resources.

18. The method of clause 17, wherein a reservation in the SCI on the overlapping resources is invalid.

19. The method of clause 17, wherein a reservation in the SCI on the overlapping resources indicates a PSSCH on the first resource pool and a PSSCH on the second resource pool.

20. The method of clause 17, wherein a reservation in the SCI on the overlapping resources indicates whether a PSSCH is scheduled on the first resource pool or the second resource pool.

21. The method of clause 20, wherein a demodulation reference signal (DMRS) scrambling identifier for the SCI or a frequency domain orthogonal cover code (FD-OCC) for the SCI indicates whether the PSSCH is scheduled on the first resource pool or the second resource pool.

22. The method of clause 21, wherein transmitting the configuration of the multiple resource pools for sidelink communications comprises transmitting a mapping of DMRS scrambling identifiers or DMRS FD-OCCs to resource pools.

23. An apparatus for wireless communication at a user equipment (UE), comprising:
   a memory storing computer-executable instructions; and
   at least one processor coupled to the memory and configured to execute the instructions to:
      receive a configuration of multiple resource pools for sidelink communications;
      receive at least two repetitions of a sidelink control information (SCI) on at least two of the multiple resource pools, each repetition of the SCI includes a reservation for a physical sidelink shared channel (PSSCH) on the respective resource pool;
      perform soft combining on the at least two repetitions of the SCI to determine resources for the PSSCH; and
      decode the PSSCH based on the SCI.

24. The apparatus of clause 23, wherein the at least one processor is configured to receive a number of the at least two repetitions of the SCI and an indication of a time resource and a frequency resource for each of the at least two repetitions of the SCI.

25. The apparatus of clause 23 or 24, wherein the PSSCH is repeated on the reservation for each repetition of the SCI.

26. The apparatus of any of clauses 23-25, wherein a first resource pool of the multiple resource pools does not overlap with a second resource pool of the multiple resource pools.

27. The apparatus of clause 26, wherein a number of the at least two repetitions is equal to a number of the multiple resource pools.

28. The apparatus of any of clauses 23-25, wherein a first resource pool of the multiple resource pools overlaps with a second resource pool of the multiple resource pools on at least some overlapping resources.

29. The apparatus of clause 28, wherein a reservation in the SCI on the overlapping resources is invalid.

30. The apparatus of clause 28, wherein a reservation in the SCI on the overlapping resources indicates a PSSCH on the first resource pool and a PSSCH on the second resource pool.

31. The apparatus of clause 28, wherein a reservation in the SCI on the overlapping resources indicates whether a PSSCH is scheduled on the first resource pool or the second resource pool.

32. The apparatus of clause 31, wherein a demodulation reference signal (DMRS) scrambling identifier for the SCI or a DMRS frequency domain orthogonal cover code (FD-OCC) for the SCI indicates whether a PSSCH is scheduled on the first resource pool or the second resource pool.

33. The apparatus of clause 32, wherein the configuration of the multiple resource pools for sidelink communications comprises a mapping of DMRS scrambling identifiers or DMRS FD-OCCs to resource pools.

34. An apparatus for wireless communication at a user equipment (UE), comprising:
   a memory storing computer-executable instructions; and
   at least one processor coupled to the memory and configured to execute the instructions to:
      transmit a configuration of multiple resource pools for sidelink communications;
      transmit at least two repetitions of a sidelink control information (SCI) on at least two of the multiple resource pools, each repetition of the SCI includes a reservation for a physical sidelink shared channel (PSSCH) on the respective resource pool; and
      transmit the PSSCH on each of the multiple resource pools based on the SCI.

35. The apparatus of clause 34, wherein the at least one processor is configured to transmit a number of the at least two repetitions of the SCI and an indication of a time resource and a frequency resource for each of the at least two repetitions of the SCI.

36. The apparatus of clause 34 or 35, wherein the PSSCH is repeated on the reservation for each repetition.

37. The apparatus of any of clauses 34-36, wherein a first resource pool of the multiple resource pools does not overlap with a second resource pool of the multiple resource pools.

38. The apparatus of clause 37, wherein a number of the at least two repetitions is equal to a number of the multiple resource pools.

39. The apparatus of any of clauses 34-36, wherein a first resource pool of the multiple resource pools overlaps with a second resource pool of the multiple resource pools on at least some overlapping resources.

40. The apparatus of clause 39, wherein a reservation in the SCI on the overlapping resources is invalid.

41. The apparatus of clause 39, wherein a reservation in the SCI on the overlapping resources indicates a PSSCH on the first resource pool and a PSSCH on the second resource pool.

42. The apparatus of clause 39, wherein a reservation in the SCI on the overlapping resources indicates whether a PSSCH is scheduled on the first resource pool or the second resource pool.

43. The apparatus of clause 42, wherein a demodulation reference signal (DMRS) scrambling identifier for the SCI or a frequency domain orthogonal cover code (FD-OCC) for the SCI indicates whether the PSSCH is scheduled on the first resource pool or the second resource pool.

44. The apparatus of clause 43, wherein the configuration of the multiple resource pools for sidelink communications comprises a mapping of DMRS scrambling identifiers or DMRS FD-OCCs to resource pools.

45. An apparatus for wireless communication at a user equipment (UE), comprising:
    means for receiving a configuration of multiple resource pools for sidelink communications;
    means for receiving at least two repetitions of a sidelink control information (SCI) on at least two of the multiple resource pools, each repetition of the SCI includes a reservation for a physical sidelink shared channel (PSSCH) on the respective resource pool;
    means for performing soft combining on the at least two repetitions of the SCI to determine resources for the PSSCH; and
    means for decoding the PSSCH based on the SCI.

46. The apparatus of clause 45, wherein the means for receiving the configuration of the multiple resource pools for sidelink communications is configured to receive a number of the at least two repetitions of the SCI and an indication of a time resource and a frequency resource for each of the at least two repetitions of the SCI.

47. The apparatus of clause 45 or 46, wherein the PSSCH is repeated on the reservation for each repetition of the SCI.

48. The apparatus of any of clauses 45-47, wherein a first resource pool of the multiple resource pools does not overlap with a second resource pool of the multiple resource pools.

49. The apparatus of clause 48 wherein a number of the at least two repetitions is equal to a number of the multiple resource pools.

50. The apparatus of any of clauses 45-47, wherein a first resource pool of the multiple resource pools overlaps with a second resource pool of the multiple resource pools on at least some overlapping resources.

51. The apparatus of clause 50, wherein a reservation in the SCI on the overlapping resources is invalid.

52. The apparatus of clause 50, wherein a reservation in the SCI on the overlapping resources indicates a PSSCH on the first resource pool and a PSSCH on the second resource pool.

53. The apparatus of clause 50, wherein a reservation in the SCI on the overlapping resources indicates whether a PSSCH is scheduled on the first resource pool or the second resource pool.

54. The apparatus of clause 53, wherein a demodulation reference signal (DMRS) scrambling identifier for the SCI or a DMRS frequency domain orthogonal cover code (FD-OCC) for the SCI indicates whether a PSSCH is scheduled on the first resource pool or the second resource pool.

55. The apparatus of clause 54, wherein the means for receiving the configuration of the multiple resource pools for sidelink communications is configured to receive a mapping of DMRS scrambling identifiers or DMRS FD-OCCs to resource pools.

56. An apparatus for wireless communication, comprising:
    means for transmitting a configuration of multiple resource pools for sidelink communications;
    means for transmitting at least two repetitions of a sidelink control information (SCI) on at least two of the multiple resource pools, each repetition of the SCI includes a reservation for a physical sidelink shared channel (PSSCH) on the respective resource pool; and
    means for transmitting the PSSCH on each of the multiple resource pools based on the SCI.

57. The apparatus of clause 56, wherein the means for transmitting the configuration of the multiple resource pools for sidelink communications is configured to transmit a number of the at least two repetitions of the SCI and an indication of a time resource and a frequency resource for each of the at least two repetitions of the SCI.

58. The apparatus of clause 56 or 57, wherein the PSSCH is repeated on the reservation for each repetition.

59. The apparatus of any of clauses 56-58, wherein a first resource pool of the multiple resource pools does not overlap with a second resource pool of the multiple resource pools.

60. The apparatus of clause 59, wherein a number of the at least two repetitions is equal to a number of the multiple resource pools.

61. The apparatus of any of clauses 56-58, wherein a first resource pool of the multiple resource pools overlaps with a second resource pool of the multiple resource pools on at least some overlapping resources.

62. The apparatus of clause 61, wherein a reservation in the SCI on the overlapping resources is invalid.

63. The apparatus of clause 61, wherein a reservation in the SCI on the overlapping resources indicates a PSSCH on the first resource pool and a PSSCH on the second resource pool.

64. The apparatus of clause 61, wherein a reservation in the SCI on the overlapping resources indicates whether a PSSCH is scheduled on the first resource pool or the second resource pool.

65. The apparatus of clause 64, wherein a demodulation reference signal (DMRS) scrambling identifier for the SCI or a frequency domain orthogonal cover code (FD-OCC) for the SCI indicates whether the PSSCH is scheduled on the first resource pool or the second resource pool.

66. The apparatus of clause 65, wherein the means for transmitting the configuration of the multiple resource pools for sidelink communications is configured to transmit a mapping of DMRS scrambling identifiers or DMRS FD-OCCs to resource pools.

67. A non-transitory computer-readable medium storing computer executable code, the code when executed by a processor of a user equipment (UE) instructs the processor to:
    receive a configuration of multiple resource pools for sidelink communications;
    receive at least two repetitions of a sidelink control information (SCI) on at least two of the multiple resource pools, each repetition of the SCI includes a reservation for a physical sidelink shared channel (PSSCH) on the respective resource pool;
    perform soft combining on the at least two repetitions of the SCI to determine resources for the PSSCH; and
    decode the PSSCH based on the SCI.

68. The non-transitory computer-readable medium of clause 67, wherein the code to receive the configuration of the multiple resource pools for sidelink communications comprises code to receive a number of the at least two repetitions of the SCI and an indication of a time resource and a frequency resource for each of the at least two repetitions of the SCI.

69. The non-transitory computer-readable medium of clause 67 or 68, wherein the PSSCH is repeated on the reservation for each repetition of the SCI.

70. The non-transitory computer-readable medium of any of clauses 67-69, wherein a first resource pool of the multiple resource pools does not overlap with a second resource pool of the multiple resource pools.

71. The non-transitory computer-readable medium of clause 70, wherein a number of the at least two repetitions is equal to a number of the multiple resource pools.

72. The non-transitory computer-readable medium of any of clauses 67-69, wherein a first resource pool of the multiple resource pools overlaps with a second resource pool of the multiple resource pools on at least some overlapping resources.

73. The non-transitory computer-readable medium of clause 72, wherein a reservation in the SCI on the overlapping resources is invalid.

74. The non-transitory computer-readable medium of clause 72, wherein a reservation in the SCI on the overlapping resources indicates a PSSCH on the first resource pool and a PSSCH on the second resource pool.

75. The non-transitory computer-readable medium of clause 72, wherein a reservation in the SCI on the overlapping resources indicates whether a PSSCH is scheduled on the first resource pool or the second resource pool.

76. The non-transitory computer-readable medium of clause 75, wherein a demodulation reference signal (DMRS) scrambling identifier for the SCI or a DMRS frequency domain orthogonal cover code (FD-OCC) for the SCI indicates whether a PSSCH is scheduled on the first resource pool or the second resource pool.

77. The non-transitory computer-readable medium of clause 76, wherein the code to receive the configuration of the multiple resource pools for sidelink communications comprises code to receive a mapping of DMRS scrambling identifiers or DMRS FD-OCCs to resource pools.

78. A non-transitory computer-readable medium storing computer executable code, the code when executed by a processor of a user equipment (UE) instructs the processor to:
   transmit a configuration of multiple resource pools for sidelink communications;
   transmit at least two repetitions of a sidelink control information (SCI) on at least two of the multiple resource pools, each repetition of the SCI includes a reservation for a physical sidelink shared channel (PSSCH) on the respective resource pool; and
   transmit the PSSCH on each of the multiple resource pools based on the SCI.

79. The non-transitory computer-readable medium of clause 78, wherein the code to transmit the configuration of the multiple resource pools for sidelink communications comprises code to transmit a number of the at least two repetitions of the SCI and an indication of a time resource and a frequency resource for each of the at least two repetitions of the SCI.

80. The non-transitory computer-readable medium of clause 78 or 79, wherein the PSSCH is repeated on the reservation for each repetition.

81. The non-transitory computer-readable medium of any of clause 78-80, wherein a first resource pool of the multiple resource pools does not overlap with a second resource pool of the multiple resource pools.

82. The non-transitory computer-readable medium of clause 81, wherein a number of the at least two repetitions is equal to a number of the multiple resource pools.

83. The non-transitory computer-readable medium of any of clause 78-80, wherein a first resource pool of the multiple resource pools overlaps with a second resource pool of the multiple resource pools on at least some overlapping resources.

84. The non-transitory computer-readable medium of clause 83, wherein a reservation in the SCI on the overlapping resources is invalid.

85. The non-transitory computer-readable medium of clause 83, wherein a reservation in the SCI on the overlapping resources indicates a PSSCH on the first resource pool and a PSSCH on the second resource pool.

86. The non-transitory computer-readable medium of clause 83, wherein a reservation in the SCI on the overlapping resources indicates whether a PSSCH is scheduled on the first resource pool or the second resource pool.

87. The non-transitory computer-readable medium of clause 86, wherein a demodulation reference signal (DMRS) scrambling identifier for the SCI or a frequency domain orthogonal cover code (FD-OCC) for the SCI indicates whether the PSSCH is scheduled on the first resource pool or the second resource pool.

88. The non-transitory computer-readable medium of clause 87, wherein the code to transmit the configuration of the multiple resource pools for sidelink communications comprises code to transmit a mapping of DMRS scrambling identifiers or DMRS FD-OCCs to resource pools.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication, comprising:
   receiving a configuration of multiple resource pools for sidelink communications, each resource pool defined by a different set of time domain resources;
   receiving at least two repetitions of a sidelink control information (SCI) on at least two of the multiple resource pools, each repetition of the SCI includes a same reservation for a physical sidelink shared channel (PSSCH) on a respective resource pool;
   performing soft combining on the at least two repetitions of the SCI to determine resources for the PSSCH, wherein a first resource pool of the multiple resource pools overlaps with a second resource pool of the multiple resource pools on at least some overlapping resources wherein the reservation in the SCI on the overlapping resources indicates a PSSCH on the first resource pool and a PSSCH on the second resource pool or indicates whether a PSSCH is scheduled on the first resource pool or the second resource pool; and
   decoding the PSSCH based on the SCI.

2. The method of claim 1, wherein receiving the configuration of the multiple resource pools for sidelink communications comprises receiving a number of the at least two repetitions of the SCI and an indication of a time resource and a frequency resource for each of the at least two repetitions of the SCI.

3. The method of claim 1, wherein the PSSCH is repeated on the reservation for each repetition of the SCI.

4. The method of claim 1, wherein a demodulation reference signal (DMRS) scrambling identifier for the SCI or a DMRS frequency domain orthogonal cover code (FD-OCC) for the SCI indicates whether a PSSCH is scheduled on the first resource pool or the second resource pool.

5. The method of claim 4, wherein receiving the configuration of the multiple resource pools for sidelink communications comprises receiving a mapping of DMRS scrambling identifiers or DMRS FD-OCCs to resource pools.

6. A method of wireless communication, comprising:
   transmitting a configuration of multiple resource pools for sidelink communications, each resource pool defined by a different set of time domain resources;
   transmitting at least two repetitions of a sidelink control information (SCI) on at least two of the multiple resource pools, each repetition of the SCI includes a same reservation for a physical sidelink shared channel (PSSCH) on a respective resource pool, wherein a first resource pool of the multiple resource pools overlaps with a second resource pool of the multiple resource pools on at least some overlapping resources wherein the reservation in the SCI on the overlapping resources indicates a PSSCH on the first resource pool and a PSSCH on the second resource pool or indicates whether a PSSCH is scheduled on the first resource pool or the second resource pool; and
   transmitting the PSSCH on each of the multiple resource pools based on the SCI.

7. The method of claim 6, wherein transmitting the configuration of the multiple resource pools for sidelink communications comprises transmitting a number of the at least two repetitions of the SCI and an indication of a time resource and a frequency resource for each of the at least two repetitions of the SCI.

8. The method of claim 6, wherein the PSSCH is repeated on the reservation for each repetition.

9. The method of claim 6, wherein a demodulation reference signal (DMRS) scrambling identifier for the SCI or a frequency domain orthogonal cover code (FD-OCC) for the SCI indicates whether the PSSCH is scheduled on the first resource pool or the second resource pool.

10. The method of claim 9, wherein transmitting the configuration of the multiple resource pools for sidelink communications comprises receiving a mapping of DMRS scrambling identifiers or DMRS FD-OCCs to resource pools.

11. An apparatus for wireless communication, comprising:
    one or more memories storing computer-executable instructions; and
    one processor one or more processors coupled to the one or more memories and, individually or in combination, configured to execute the instructions to cause the apparatus to:
      receive a configuration of multiple resource pools for sidelink communications, each resource pool defined by a different set of time domain resources;
      receive at least two repetitions of a sidelink control information (SCI) on at least two of the multiple resource pools, each repetition of the SCI includes a same reservation for a physical sidelink shared channel (PSSCH) on a respective resource pool;
      perform soft combining on the at least two repetitions of the SCI to determine resources for the PSSCH, wherein a first resource pool of the multiple resource pools overlaps with a second resource pool of the multiple resource pools on at least some overlapping resources wherein the reservation in the SCI on the overlapping resources indicates a PSSCH on the first resource pool and a PSSCH on the second resource pool or indicates whether a PSSCH is scheduled on the first resource pool or the second resource pool; and
      decode the PSSCH based on the SCI.

12. The apparatus of claim 11, wherein the one or more processors, individually or in combination, are configured to cause the apparatus to receive a number of the at least two repetitions of the SCI and an indication of a time resource and a frequency resource for each of the at least two repetitions of the SCI.

13. The apparatus of claim 11, wherein the PSSCH is repeated on the reservation for each repetition of the SCI.

14. The apparatus of any of claim 11, wherein a demodulation reference signal (DMRS) scrambling identifier for the SCI or a DMRS frequency domain orthogonal cover code (FD-OCC) for the SCI indicates whether a PSSCH is scheduled on the first resource pool or the second resource pool.

15. The apparatus of claim 14, wherein to receive the configuration of the multiple resource pools for sidelink communications, the one or more processors, individually or in combination, are configured to cause the apparatus to receive a mapping of DMRS scrambling identifiers or DMRS FD-OCCs to resource pools.

16. An apparatus for wireless communication at a user equipment (UE), comprising:
a one or more memories storing computer-executable instructions; and
one or more processors coupled to the one or more memories and, individually or in combination, configured to execute the instructions to cause the apparatus to:
transmit a configuration of multiple resource pools for sidelink communications, each resource pool defined by a different set of time domain resources;
transmit at least two repetitions of a sidelink control information (SCI) on at least two of the multiple resource pools, each repetition of the SCI includes a same reservation for a physical sidelink shared channel (PSSCH) on a respective resource pool, wherein a first resource pool of the multiple resource pools overlaps with a second resource pool of the multiple resource pools on at least some overlapping resources wherein the reservation in the SCI on the overlapping resources indicates a PSSCH on the first resource pool and a PSSCH on the second resource pool or indicates whether a PSSCH is scheduled on the first resource pool or the second resource pool; and
transmit the PSSCH on each of the multiple resource pools based on the SCI.

17. The apparatus of claim 16, wherein the one or more processors, individually or in combination, are configured to transmit a number of the at least two repetitions of the SCI and an indication of a time resource and a frequency resource for each of the at least two repetitions of the SCI.

18. The apparatus of claim 16, wherein the PSSCH is repeated on the reservation for each repetition of the SCI.

19. The apparatus of claim 16, wherein a demodulation reference signal (DMRS) scrambling identifier for the SCI or a frequency domain orthogonal cover code (FD-OCC) for the SCI indicates whether the PSSCH is scheduled on the first resource pool or the second resource pool.

20. The apparatus of claim 19, wherein to transmit the configuration of the multiple resource pools for sidelink communications, the one or more processors, individually or in combination, are configured to receive a mapping of DMRS scrambling identifiers or DMRS FD-OCCs to resource pools.

* * * * *